United States Patent
Tsukahara et al.

(10) Patent No.: US 9,235,793 B2
(45) Date of Patent: Jan. 12, 2016

(54) INFORMATION PROCESSING APPARATUS, STORAGE MEDIUM, AND INFORMATION PROCESSING SYSTEM

(71) Applicants: Mina Tsukahara, Kanagawa (JP); Rina Takahashi, Kanagawa (JP)

(72) Inventors: Mina Tsukahara, Kanagawa (JP); Rina Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/105,675

(22) Filed: Dec. 13, 2013

(65) Prior Publication Data

US 2014/0176976 A1 Jun. 26, 2014

(30) Foreign Application Priority Data

Dec. 25, 2012 (JP) ................................. 2012-281304

(51) Int. Cl.
*G06K 15/00* (2006.01)
*G03G 15/00* (2006.01)

(52) U.S. Cl.
CPC ............ *G06K 15/406* (2013.01); *G03G 15/502* (2013.01); *G03G 15/5004* (2013.01)

(58) Field of Classification Search
CPC .......... H04N 1/00896; H04N 1/00482; H04N 1/00411; H04N 1/00474; H04N 1/00408; H04N 1/00413; H04N 1/00904; H04N 1/00891; H04N 2201/0094; G03G 15/5004; G03G 15/205; G06K 15/4055; G06K 15/0225; G06K 15/406; G06F 3/1221; G06F 1/3265; G06F 1/3203; G06F 1/3284

USPC ......... 358/1.13–1.15; 345/173, 156; 713/323, 713/320; 399/70

See application file for complete search history.

(56) References Cited

U.S. PATENT DOCUMENTS

2008/0231878 A1* 9/2008 Yano et al. .................... 358/1.13
2011/0199628 A1* 8/2011 Tohki et al. ................... 358/1.13

FOREIGN PATENT DOCUMENTS

| JP | 2006-218211 | 8/2006 |
| JP | 2010-079566 | 4/2010 |
| JP | 2011-043932 | 3/2011 |
| JP | 2011-151806 | 8/2011 |

* cited by examiner

*Primary Examiner* — Jacky X Zheng

(74) *Attorney, Agent, or Firm* — Harness, Dickey & Pierce, P.L.C.

(57) ABSTRACT

An information processing apparatus which has a first and second mode in which power consumption is lower than that of the first mode is disclosed that includes an accepting unit configured to accept an operation; a display configured to transmit a notification when the apparatus switches from the second mode to the first mode; and a control unit configured to store function data representing function providing units registered; generate, in response to the notification received from the display, a first screen indicating the units and cause the display to display the first screen; store identification data identifying one of the units selected; transmit, in response to the notification received from the display, the notification to the units represented in the function data; and when a response is received from the unit identified in the identification data, cause the display to display a second screen generated by the identified unit.

7 Claims, 20 Drawing Sheets

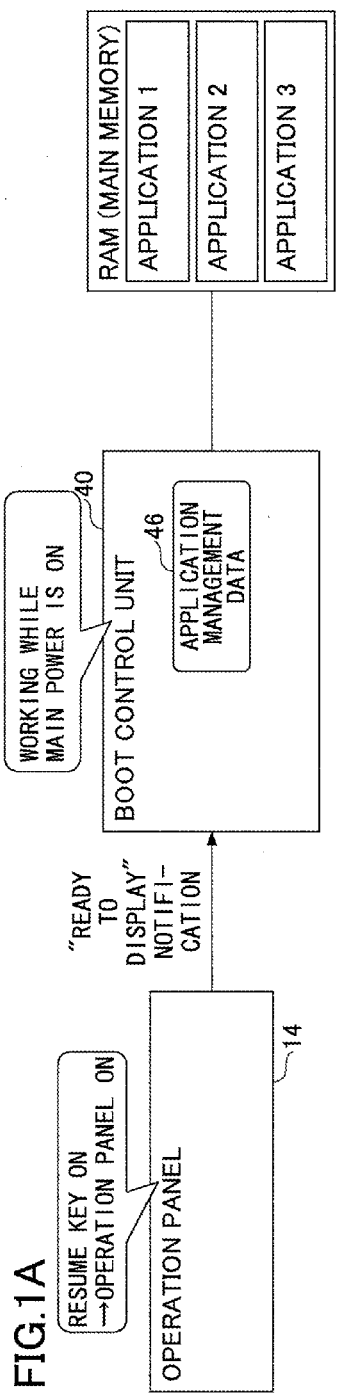
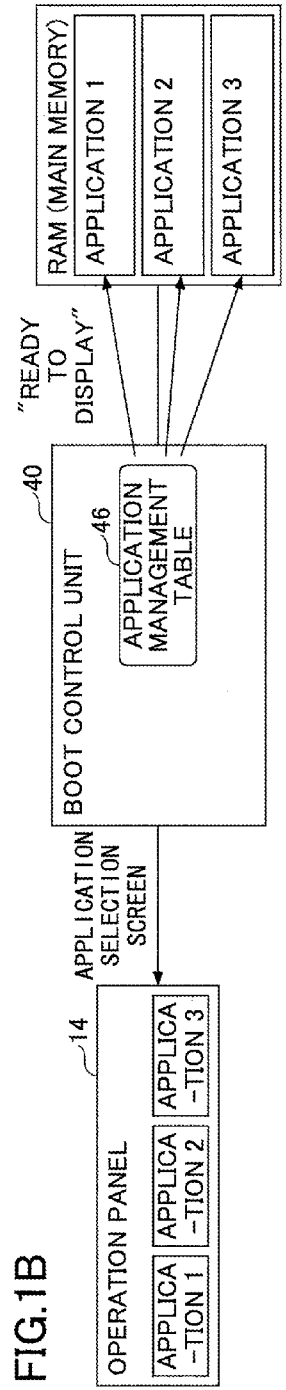
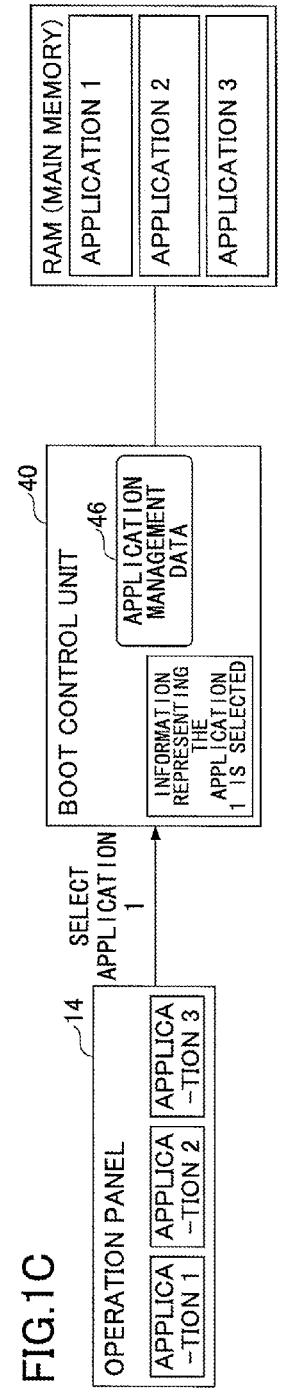

FIG.8

| APPLICATION NAME | DISPLAY NAME | SELECTION SCREEN | START FLAG | NOTIFICATION ORDER | RESPONSE TO "READY TO DISPLAY" NOTIFICATION 46 |
|---|---|---|---|---|---|
| Copy.xxx | COPY | 1 | 1 | 1 | RECEIVED |
| Printer.xxx | PRINTER | 2 | 1 | 3 | RECEIVED |
| Fax.xxx | FAX | 3 | 1 | 2 | RECEIVED |
| Scan.xxx | SCANNER | — | 1 | 4 | RECEIVED |
| Dboc.xxx | DOCUMENT BOX | — | 1 | 5 | NOT RECEIVED |
| Web.xxx | Web | — | 1 | 6 | NOT RECEIVED |

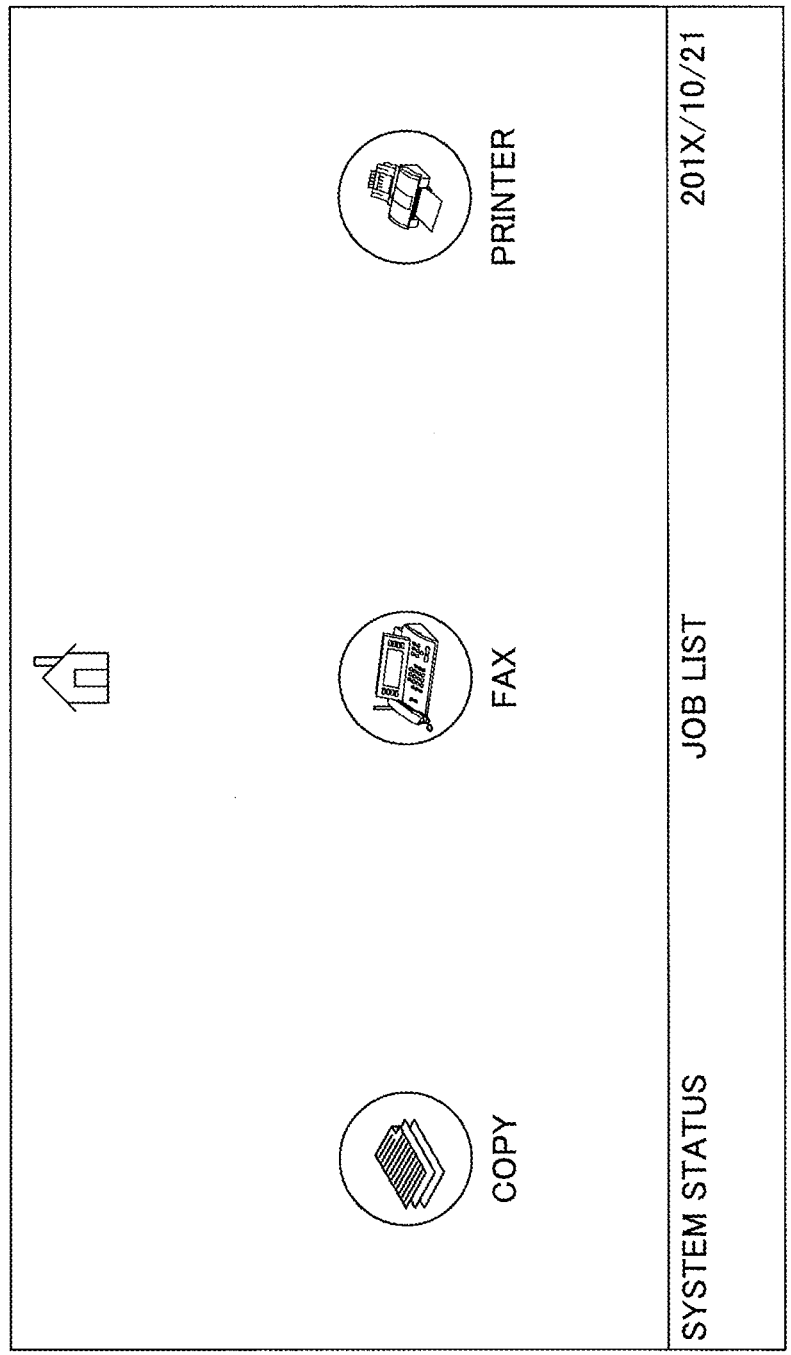

INFORMATION PROCESSING APPARATUS, STORAGE MEDIUM, AND INFORMATION PROCESSING SYSTEM

BACKGROUND OF THE INVENTION

1. Field of the Invention

An aspect of this disclosure is related to an information processing apparatus, a computer-readable storage medium, and an information processing system. In particular, an aspect of this disclosure is related to an information processing apparatus which may operate in a first operation mode and a second operation mode in which power consumption is lower than the first operation mode.

2. Description of the Related Art

Conventionally, an image forming apparatus such as a printer has various functions, such as a copy function, a scanner function, and a fax function, and is used in an office or another place. Recently, in addition to conventional usage such as printing with the printer function or scanning with the scanner function, the image forming apparatus gets to be used as an information processing apparatus. The image forming apparatus may run various application programs (hereinafter called "application") selected by a user after showing an application selection screen on a display unit of the image forming apparatus. The image forming apparatus is in a standby mode which enables each application to create and display a UI screen for accepting user operations on the display unit in a short time.

However, when the user is not going to use the image forming apparatus for a while, the user may shut off the main power of the image forming apparatus. Responding to a rise in awareness of energy saving, an image forming apparatus becomes common, which may transition to an energy saving mode while the image forming apparatus is not being used and go back to the standby mode when the image forming apparatus is to be used. The user desires to check the UI screen of the application display and start to use it as soon as possible from a main power off state or the energy saving mode. However, when the image forming apparatus is in the main power off state, the user has to wait an amount of time required to complete start processes for the image forming apparatus and the application the user desires to use. When the image forming apparatus is in the energy saving mode, the user has to wait an amount of time required to complete a transition process for the image forming apparatus to transition to the standby mode and a start process for the application.

A technology has been developed to reduce the time required for the start processes and the transition process of the image forming apparatus as well as the start process of the application (e.g. Patent Document 1). Patent Document 1 discloses an information processing apparatus which starts the application performing a function specified in priority information stored in an EEPROM when the information processing apparatus is switched on. When the start process of the application completes, the information processing apparatus transitions to a state in which an initial screen for the started function is displayed and user operations may be accepted. Thus, the information processing apparatus may start the application prioritized by the user and show a screen desired by the user quickly.

Although the information processing apparatus starts the prioritized application, the user does not necessarily use the same application at any time. Thus, a start process of the other application that the user desires to use may be delayed. In addition, when two users (User A and User B) desire to use applications different from each other, the information processing apparatus has the potential to start one application which is not desired by either User A or User B.

At least one embodiment of the present invention is aimed at resolving the above problem and providing an information processing apparatus which makes it possible to display a screen of an application desired by a user quickly.

SUMMARY OF THE INVENTION

In an aspect of this disclosure, there is provided an information processing apparatus which has a first operation mode and a second operation mode in which a display on the information processing apparatus is turned off and power consumption is lower than that of the first operation mode, the information processing apparatus including: an operation accepting unit configured to accept an operation; a display unit configured to transmit a notification at a time when the information processing apparatus switches from the second operation mode to the first operation mode; and a control unit configured to store registered function data, the registered function data representing one or more function providing units registered in the information processing apparatus; generate, in response to the notification received from the display unit, a first screen indicating the function providing units and cause the display unit to display the first screen; store identification data identifying one of the function providing units selected via the operation accepting unit; transmit, in response to the notification received from the display unit, the notification to the function providing units represented in the registered function data; and when a response to the transmitted notification is received from the function providing unit identified in the identification data, cause the display unit to display a second screen generated by the identified function providing unit.

According to another embodiment of this invention, there is provided a non-transitory computer-readable storage medium storing program code for causing an information processing apparatus to perform a process, wherein the information processing apparatus has a first operation mode and a second operation mode in which a display on the information processing apparatus is turned off and power consumption is lower than that of the first operation mode, the information processing apparatus including an operation accepting unit configured to accept an operation; a display unit configured to transmit a notification at a time when the information processing apparatus switches from the second operation mode to the first operation mode; and a control unit configured to store registered function data, the registered function data representing one or more function providing units registered in the information processing apparatus; wherein the process includes a step of generating, in response to the notification received from the display unit, a first screen indicating the function providing units and causing the display unit to display the first screen; a step of storing identification data identifying one of the function providing units selected via the operation accepting unit; a step of receiving from the display unit, the notification to the function providing units represented in the registered function data; and a step of causing, when a response to the transmitted notification is received from the function providing unit identified in the identification data, the display unit to display a second screen generated by the identified function providing unit.

According to another embodiment of this invention, there is provided an information processing system including a terminal; and an information processing apparatus which has a first operation mode and a second operation mode in which power consumption is lower than that of the first operation mode, wherein the terminal includes an operation accepting unit configured to accept an operation; and a display unit configured to transmit a notification at a time when the information processing apparatus switches from the second operation mode to the first operation mode; wherein the information processing apparatus includes a control unit configured to store registered function data, the registered function data representing one or more function providing units registered in the information processing apparatus; generate, in response to the notification received from the display unit, a first screen indicating the function providing units and cause the display unit to display the first screen; store identification data identifying one of the function providing units selected via the operation accepting unit; transmit, in response to the notification received from the display unit, the notification to the function providing units represented in the registered function data; and when a response to the transmitted notification is received from the function providing unit identified in the identification data, cause the display unit to display a second screen generated by the identified function providing unit.

At least one embodiment of the invention makes it possible to display a screen of an application desired by a user quickly.

BRIEF DESCRIPTION OF THE DRAWINGS

Other objects and further features of embodiments may become apparent from the following detailed description when read in conjunction with the accompanying drawings, in which:

FIG. 1A is a drawing illustrating an overview of a procedure for an image forming apparatus according to an embodiment of this invention to accept a selection of applications and display a screen of the applications;

FIG. 1B is a drawing illustrating an overview of a procedure for an image forming apparatus according to an embodiment of this invention to accept a selection of applications and display a screen of the applications;

FIG. 1C is a drawing illustrating an overview of a procedure for an image forming apparatus according to an embodiment of this invention to accept a selection of applications and display a screen of the applications;

FIG. 8 is a drawing illustrating an example of an application management table;

FIG. 9A is a drawing illustrating an example of an application selection screen;

DESCRIPTION OF THE PREFERRED EMBODIMENTS

Figure 1D:
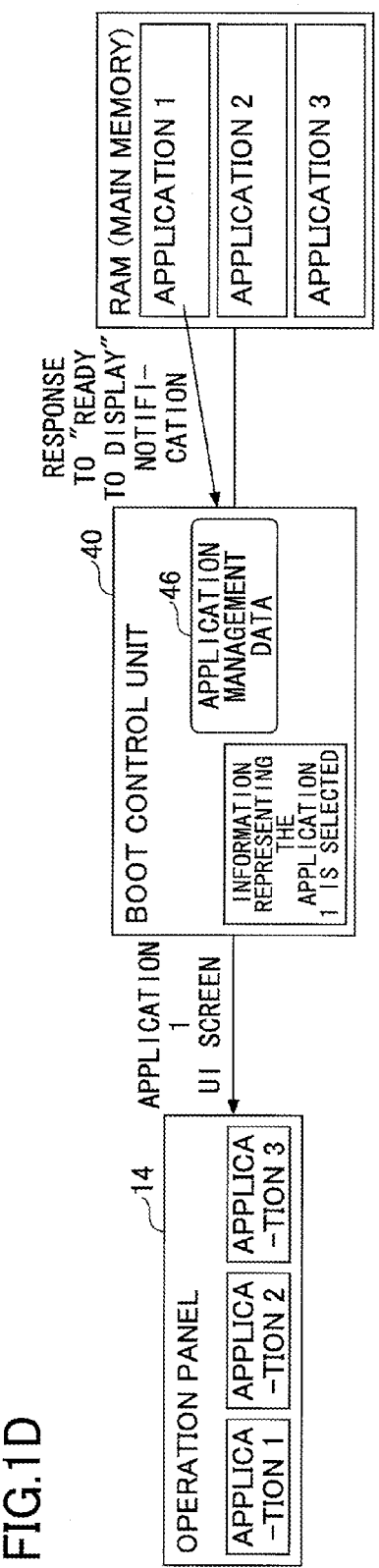
FIG. 1D is a drawing illustrating an overview of a procedure for an image forming apparatus according to an embodiment of this invention to accept a selection of applications and display a screen of the applications.
Figure 1E:
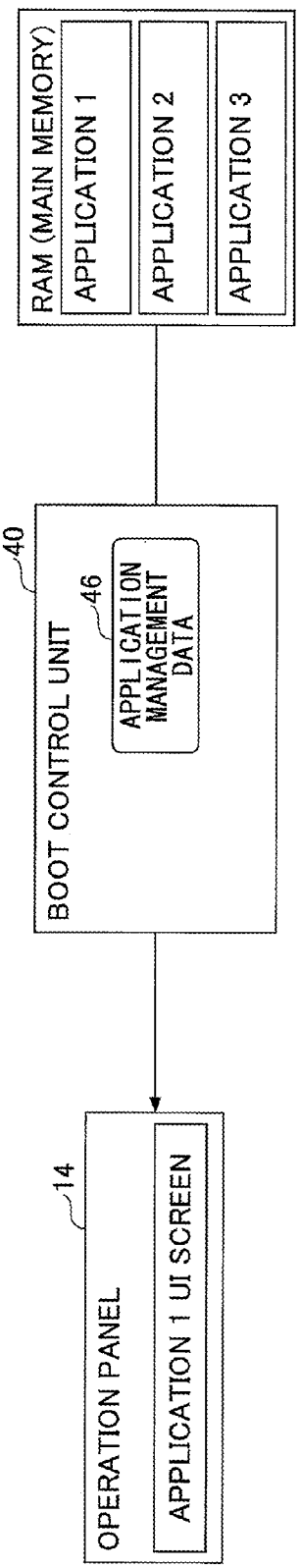
FIG. 1E is a drawing illustrating an overview of a procedure for an image forming apparatus according to an embodiment of this invention to accept a selection of applications and display a screen of the applications.
Figure 2A:
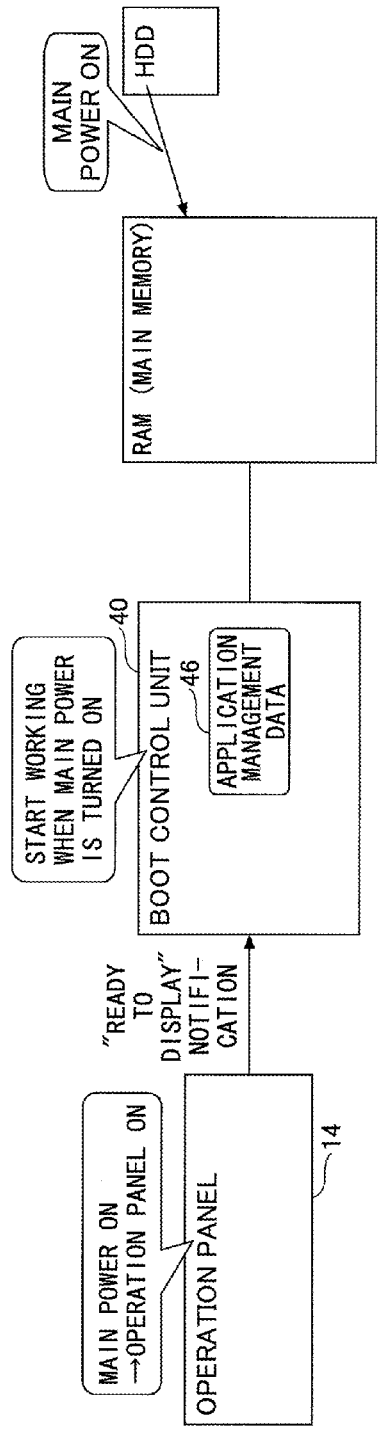
FIG. 2A is a drawing illustrating an overview of a procedure for an image forming apparatus according to an embodiment of this invention to turn on the main power, accept a selection of an application, and display a screen of the application.
Figure 2B:
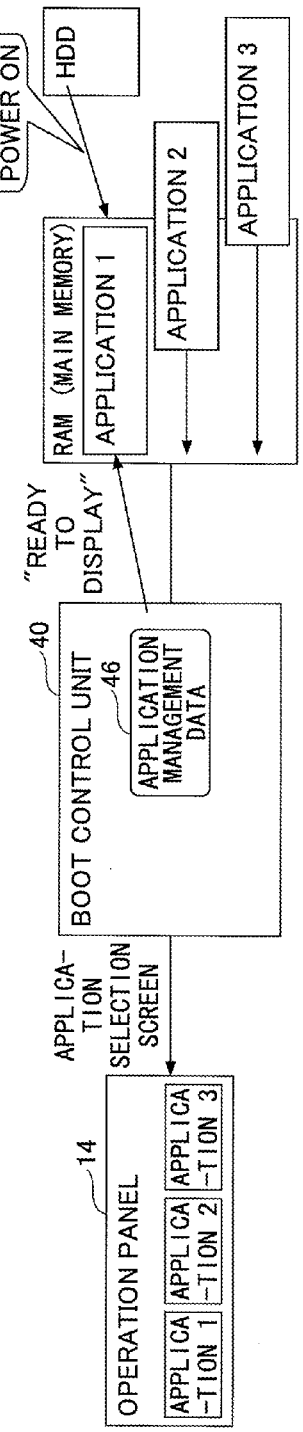
FIG. 2B is a drawing illustrating an overview of a procedure for an image forming apparatus according to an embodiment of this invention to turn on the main power, accept a selection of an application, and display a screen of the application.
Figure 2C:
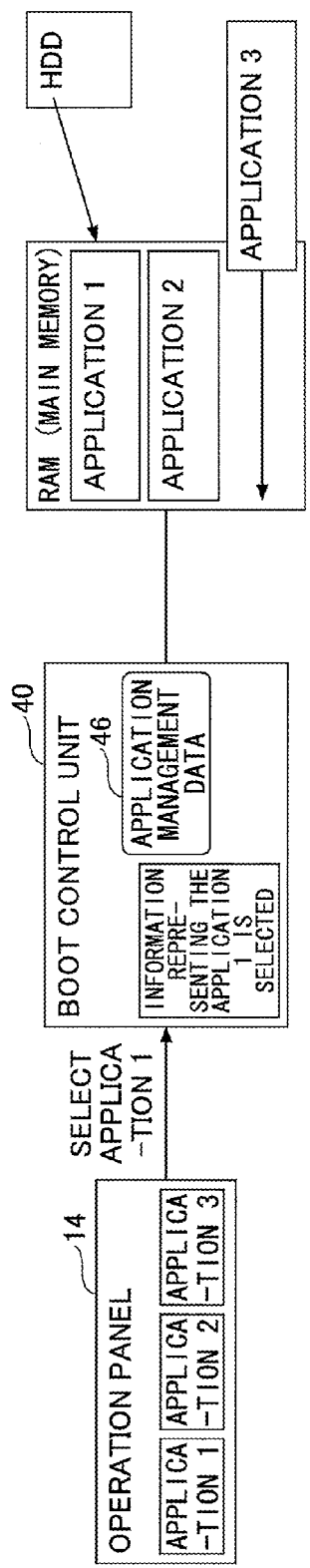
FIG. 2C is a drawing illustrating an overview of a procedure for an image forming apparatus according to an embodiment of this invention to turn on the main power, accept a selection of an application, and display a screen of the application.
Figure 2D:
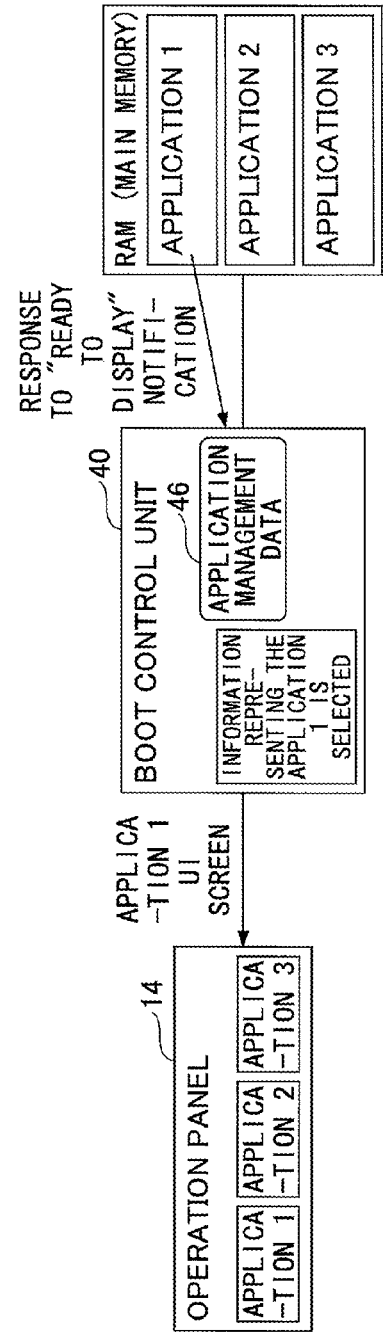
FIG. 2D is a drawing illustrating an overview of a procedure for an image forming apparatus according to an embodiment of this invention to turn on the main power, accept a selection of an application, and display a screen of the application.
Figure 2E:
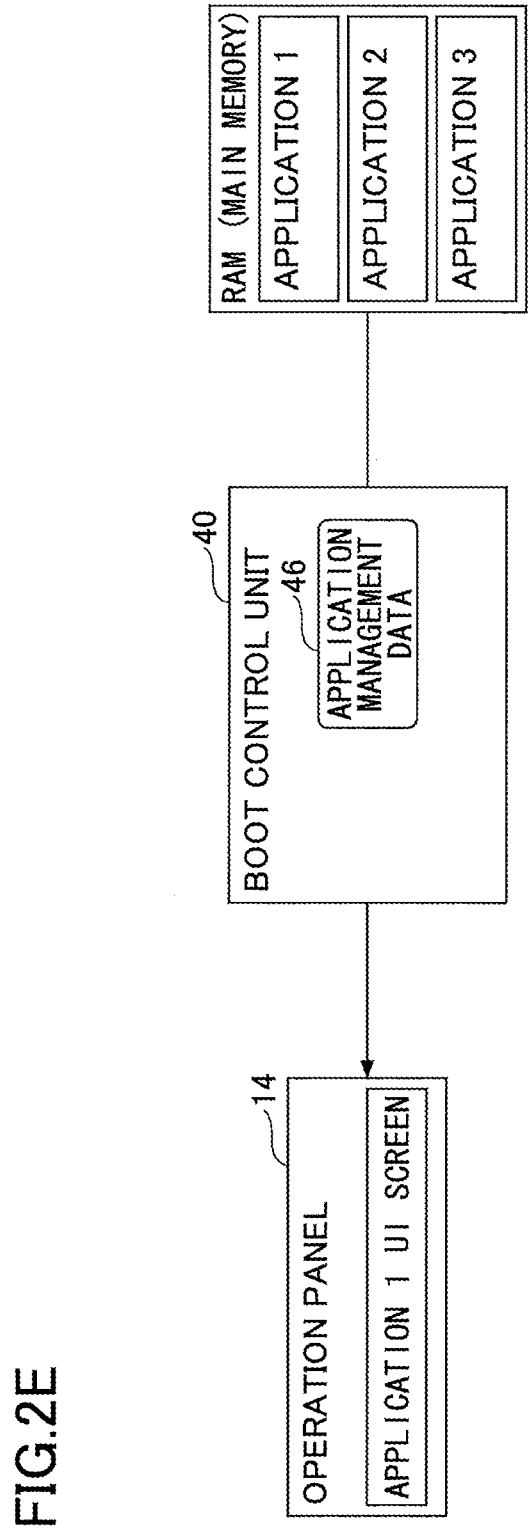
FIG. 2E is a drawing illustrating an overview of a procedure for an image forming apparatus according to an embodiment of this invention to turn on the main power, accept a selection of an application, and display a screen of the application.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

[First Embodiment]

FIGS. 1A-1E are drawings illustrating an overview of a procedure for an image forming apparatus according to an embodiment of this invention to accept a selection of applications and display a UI screen of the applications. The image forming apparatus shown in FIGS. 1A-1E are in an energy saving mode after main power is turned on. In the energy saving mode, an operation panel 14 is turned off, and a system including information processing functional components such as a CPU, a Random Access Memory (RAM), a Read Only Memory (ROM), etc. is turned on.

A boot control unit 40 is a function implemented by a program such as an operation system (OS) performed by the system. The boot control unit 40 may control screen display for the applications. The boot control unit 40 may control the screen display for the applications registered in an application management table 46 (See FIG. 2). The boot control unit 40 may operate in the energy saving mode.

(FIG. 1A) The operation panel 14 is turned on when a user does an operation to trigger transition to a standby mode (i.e. an operation mode in which the user may use functions of the image forming apparatus). The operation panel 14 may transmit a "ready to display" notification to the boot control unit 40. The notification indicates that the display is ready to show the screen for the applications.

(FIG. 1B) After the boot control unit 40 detects, by receiving the "ready to display" notification, that the operation panel 14 is ready to show a screen, the boot control unit 40 may transmit an application selection screen to the operation panel 14. The application selection screen is used by the user to select one of the applications registered in the application management table 46.

The boot control unit 40, which has transmitted the application selection screen to the operation panel 14, may transmit the "ready to display" notification to applications 1-3 in response to the "ready to display" notification from the operation panel 14. The applications 1-3 start to create UI screens depending on each application.

In this way, the operation panel 14 displays the application selection screen before the applications 1-3 create UI screens so that the user may feel a duration to wait to operate the image forming apparatus is reduced.

(FIG. 1C) When the user selects the application 1 on the application selection screen, the boot control unit 40 stores information indicating the application 1 is selected. By storing the information representing that the application 1 is selected, even if the application 1 has not yet created a UI screen after the application 1 was selected, the boot control unit 40 may transmit the UI screen to the operation panel 14 after the application 1 finishes creating the UI screen.

(FIG. 1D) The application 1 transmits a response to the "ready to display" notification to the boot control unit 40 when the application 1 becomes ready to display the UI screen. The boot control unit 40 detects the response transmitted by the application 1 indicated in the information representing that the application 1 is selected, and transmits the UI screen for the application 1 to the operation panel 14. In this way, the UI screen for the application 1 may be displayed just after the application 1 selected by the user is ready to display the UI screen. In addition, the applications 2, 3 transmit the response to the "ready to display" notification to the boot control unit 40 when the applications 2, 3 become ready to display respective UI screens.

(FIG. 1E) The operation panel 14 displays the UI screen for the application 1.

The image forming apparatus according to the present embodiment may smoothly display the UI screen when the image forming apparatus resumes from the energy saving mode as well as when the image forming apparatus boots (e.g. when the main power is turned on or the power of the CPU is turned on).

FIGS. 2A-2E are drawings illustrating an overview of a procedure for the image forming apparatus to turn on the main power, accept a selection for the application, and display the screen of the application.

(FIG. 2A) When the main power is turned on, the boot control unit 40 is started, and the operation panel 14 is turned on. Since static information about the application management table 46 is stored in a non-volatile memory while the main power is off, the boot control unit 40 may access the application management table 46 just after the start up even if the applications are not started. The boot control unit 40 which is started receives the "ready to display" notification from the operation panel 14.

(FIG. 2B) the image forming apparatus starts the applications after starting the OS. After the boot control unit 40 receives the "ready to display" notification from the operation panel 14, the boot control unit 40 transmits the application selection screen to the operation panel 14 regardless of startup statuses of the applications. Because the operation panel 14 may display an application selection screen even if the applications have not started, the user may feel that wait time is reduced. The boot control unit 40 transmits the "ready to display" notification to the applications which are started.

(FIG. 2C) When the user selects the application 1 on the application selection screen, the boot control unit 40 stores information indicating the application 1 is selected. By storing the information representing that the application 1 is selected, even if the application 1 has yet not created a UI screen after the application was selected, the boot control unit 40 may transmit the UI screen to the operation panel 14 after the application 1 finishes creating the UI screen.

(FIG. 2D) The application 1 transmits a response to the "ready to display" notification to the boot control unit 40 when the application 1 becomes ready to display the UI screen. The boot control unit 40 detects the response transmitted by the application 1 indicated in the information representing that the application 1 is selected and transmits the UI screen for the application 1 to the operation panel 14. The operation panel 14 displays the UI screen for the application 1. In this way, the UI screen for the application 1 may be displayed just after the application 1 selected by the user is ready to display the UI screen.

(FIG. 2E) The operation panel 14 displays the UI screen for the application 1.

In this way, the image forming apparatus according to this embodiment may reduce the waiting time for the user by displaying the application selection screen regardless of the startup statuses of the applications. In addition, as the image forming apparatus stores information about the application the user selected, the image forming apparatus may display, without user's selection, the UI screen for the selected application when the selected application transmits the response to the "ready to display" notification. Thus, for any applications, the waiting time from when the user selected the application to when the UI screen is displayed may be reduced to be less than that when a prioritized application is set. (Their waiting times cannot be compared strictly because the prioritized application is not configured and the application selection screen is displayed in this embodiment. Provided that the user selected the prioritized application, the waiting time is the same, but provided that the user selected a non-prioritized application, the waiting time is shorter in this embodiment.)

[Configuration]

Figure 3:
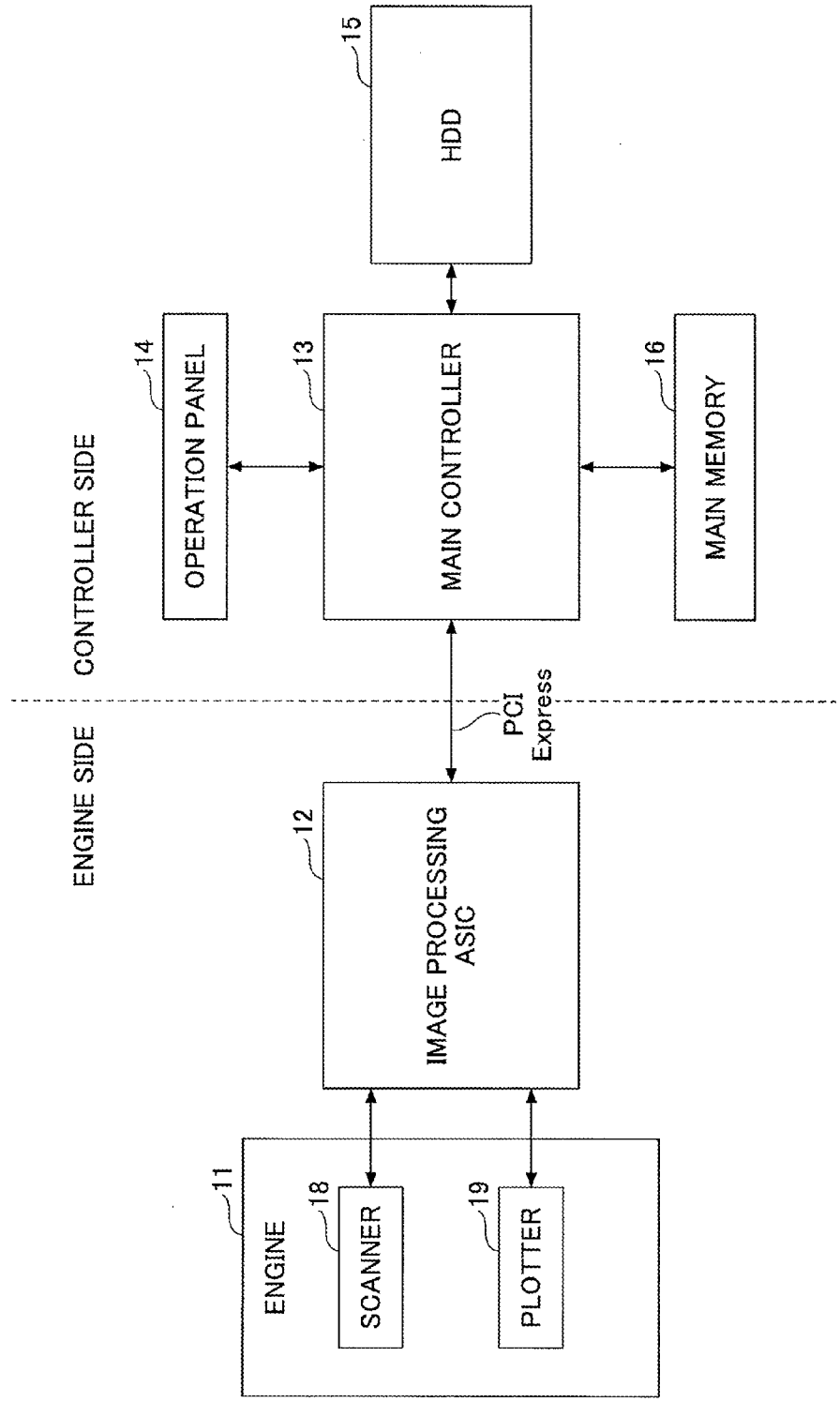
FIG. 3 is a drawing illustrating an overview of a configuration for an image forming apparatus according to an embodiment of this invention.

FIG. 3 is a drawing illustrating an overview of a configuration for the image forming apparatus. The image forming apparatus 100 is divided into an engine-side and a controller-side. Both sides are connected via a high speed bus such as PCI Express. A scanner 18 and a plotter 19 are placed at the engine-side. In addition, a FAX engine may be placed at the engine-side. The image forming apparatus 100 as a printer may have at least the plotter 19 (i.e. the scanner 18 may be omitted).

The scanner 18 optically reads a copy placed on a contact glass or an auto document feeder (ADF) with a line sensor including a CCD. In the CCD, light having passed through a color filter (RGB) is processed by photoelectric conversion and then image data with color reflecting contrasting density of the copy in a predetermined resolution is created. After image processing, the image data is stored on a main memory 16 on the controller-side and used by the plotter 19 to output the image data on paper or by the FAX engine to transmit the image data via a telephone line. In addition, the image data may be transmitted from an external interface (not shown in FIG. 3) to other devices.

The plotter 19 prints the image data stored in the main memory 16 on recording media such as paper. The plotter 19 may operate as an image forming unit including a photoreceptor, an electrifier, a lithographic exposure unit, a development counter, a cleaning unit, a static eliminator, a transfer belt, a paper path structure, a fuser, a paper feed tray, a copy receiving tray, etc. Alternatively, the image forming unit may employ an ink jet printing system instead of such an electrophotography system. There are two systems for the plotter 19 which employs the electrophotography system. One is a tandem system preparing photoreceptors for colors (CMYK), and the other is a four cycle system in which toner images with four colors are transferred on an intermediate transfer unit and then the superposed toner image is transferred on paper at once.

An image processing ASIC 12 performs image processing on the image data scanned by the scanner 18 and outputs the image data to a main controller 13. The image processing ASIC 12 performs modification to the image data scanned by the scanner 18 according to a characteristic difference of the scanner CCD. For example, the image processing ASIC 12 may perform shading, a gamma conversion, a filter processing, a color conversion (RGB to RGB), etc. Due to that modification, the same image data is created regardless of the difference of the scanner 18.

In addition, the image processing ASIC 12 may perform image processing which causes the plotter 19 to print the image data conveyed from the main controller 13, and transmit the image data corresponding to the print timing of the plotter 19. For example, the image processing ASIC 12 may perform a skew correction, a doubling process for density, a jaggy correction, a trimming process, and a pattern creation such as a tint block for the image data. In addition, such modification processes may be performed for each image data (CMYK). The image processing ASIC 12 transmits each image data at different timing.

At the controller-side, the operation panel 14, a hard disk drive (HDD) 15, and the main memory 16 are connected to the main controller 13. Here, functions which are not used for main characterizing portions in this embodiment are omitted.

The main controller 13 may perform, using the main memory 16, rotation or modification for the image data used in the image forming apparatus 100. In addition, the main controller 13 may store the image data in the HDD 15, and exchange the image data with the image processing ASIC 12. The main controller 13 has additional CPUs in addition to a main CPU which controls the image forming apparatus 100.

The main memory 16 may provide a work area in which programs for controlling the image forming apparatus 100 are extracted and a temporal storage area (e.g. image memory) for the image data.

The operation panel 14 has a touch panel display unit such as a liquid crystal display. The operation panel 14 may display many kinds of screens, a status of the image forming apparatus 100, and a job history. In addition, the operation panel 14 may provide a user interface for accepting user operations. Furthermore, the operation panel 14 has hardware keys such as a start button and a numeric keypad.

The HDD 15 may store font data, platform data including the OS, programs for the applications, and programs providing functions as described later. The HDD 15 may be used to store a printer description language (PDL).

Figure 4:
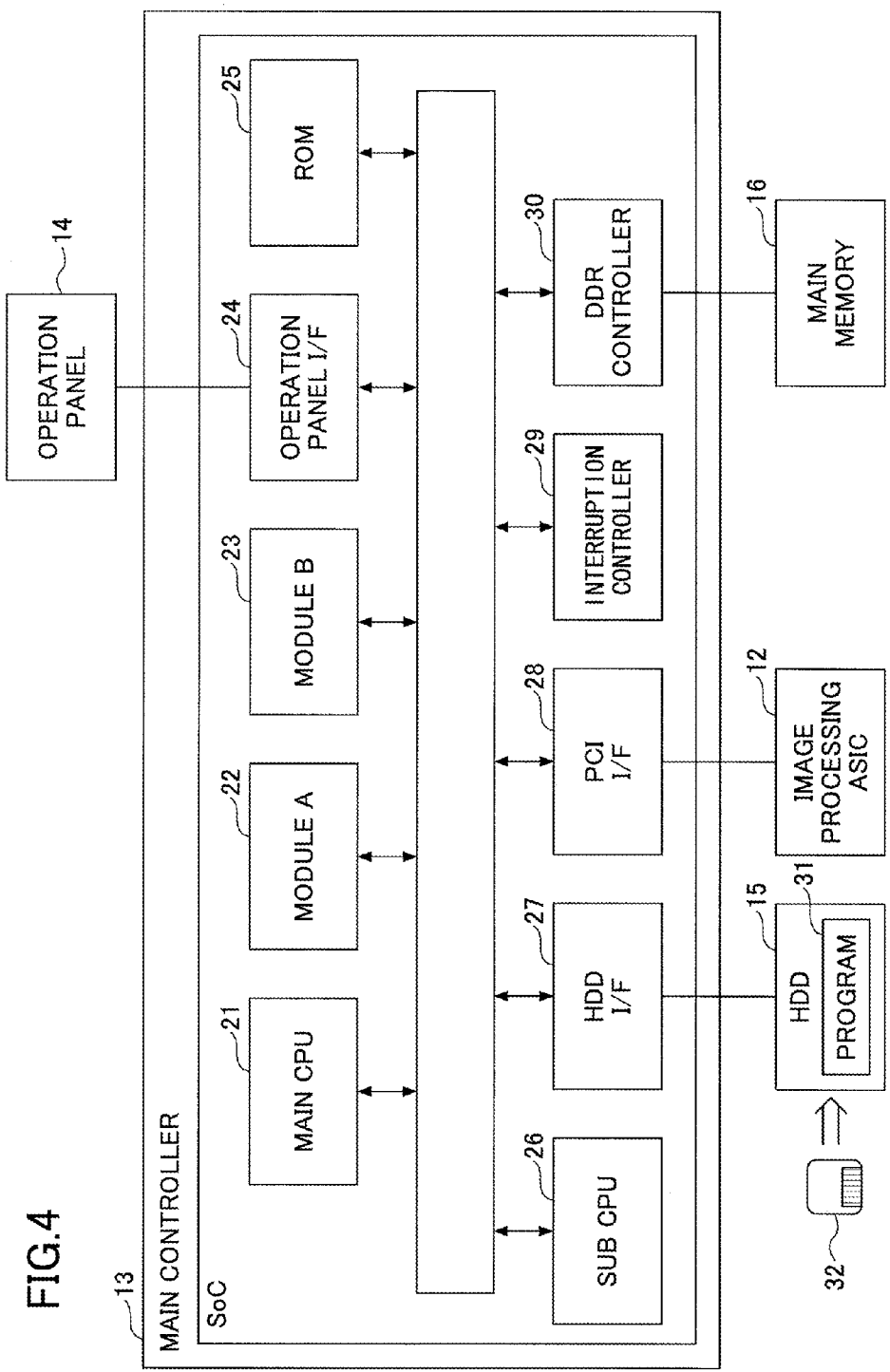
FIG. 4 is a block diagram of a main controller.

FIG. 4 is a block diagram of the main controller 13. The main controller 13 is implemented by system on chip (SoC). However, one or more blocks may be implemented by an independent chip. Alternatively, a plurality of the blocks may be integrated into a single block or chip.

The main controller 13 has a main CPU 21, modules 22, 23 (hereinafter called module A, B), an operation panel interface 24, a ROM 25, a sub CPU 26, a HDD interface 27, a PCI interface 28, an interruption controller 29, and a DDR controller 30 which are connected with a bus. Hereinafter, each unit may be called just "block" regardless of a kind of the unit.

The main CPU 21 totally controls the image forming apparatus 100 including the controller-side and the engine-side. For example, in response to a user operation on the operation panel 14, the main CPU 21 may execute a job such as copying, printing or scanning. When the main CPU 21 receives PDL data from a PC via a network interface (not shown), the main CPU 21 analyzes the PDL data and performs a printing job.

The operation panel interface 24 operates as an interface between the operation panel 14 and the main CPU 21. The operation panel interface 24 transmits various screens (e.g. an application selection screen and a UI screen) to the operation panel 14 to display them. For example, the UI screen shows a configuration menu indicating conditions for job execution and a software keyboard. When the operation panel 14 receives a user operation for the conditions and transmits a notification to the operation panel interface 24, the operation panel interface 24 updates the screen. The operation panel interface 24 conveys the final conditions to the main CPU 21.

The modules A, B are examples of general-purpose functional blocks operating as an interface unit for detecting an interruption causing the image forming apparatus to resume from the energy saving mode or another specific functional unit. For example, the specific functional unit includes a USB interface for a movable storage medium such as a USB memory, a network card interface, an ADF controller, and an image processing module for rotation or modification.

The operation panel interface 24 and the modules A, B are directly connected with an interruption controller 29. The interruption controller 29 has a register in which an element corresponding to an interrupting block turns on. The interruption controller 29 transmits a notification indicating a content of the interruption to the sub CPU 26 according to the interrupting block.

The sub CPU 26 controls mode transition for energy savings. For example, the sub CPU 26 accepts a notification from a timer indicating that a certain time has lapsed (or the sub CPU 26 detects that conditions are met for the mode transition for energy saving at an operation mode), and the sub CPU 26 changes statuses of the blocks so as to transition to another operation mode. When resuming from the operation mode for energy saving, the sub CPU 26 changes the statuses of the blocks so as to transition to an operation mode corresponding to a case of resuming from the operation mode for energy saving. The sub CPU 26 is always turned on except for special models of image forming apparatuses, and the sub CPU 26 performs the process to resume from the operation mode for energy saving when the sub CPU 26 detects the cause.

The HDD interface 27 is an interface for the HDD 15. The PCI interface 28 is an interface for communicating with the image processing ASIC 12 (an engine 11) by PCI Express bus. The HDD 15 stores programs 31. The programs 31 are stored in recording media in advance. Alternatively, the programs 31 may be downloaded and distributed from a server (not shown).

The DDR controller 30 may provide a write function to the main memory 16 and a read function from the main memory 16. In the write function, the DDR controller 30 writes data obtained from a peripheral device directed by the CPU 21 into an address in the main memory 16. In the read function, the DDR controller 30 reads the data from the address in the main memory 16 directed by the CPU 21.

[Operation Mode]

Figure 5:
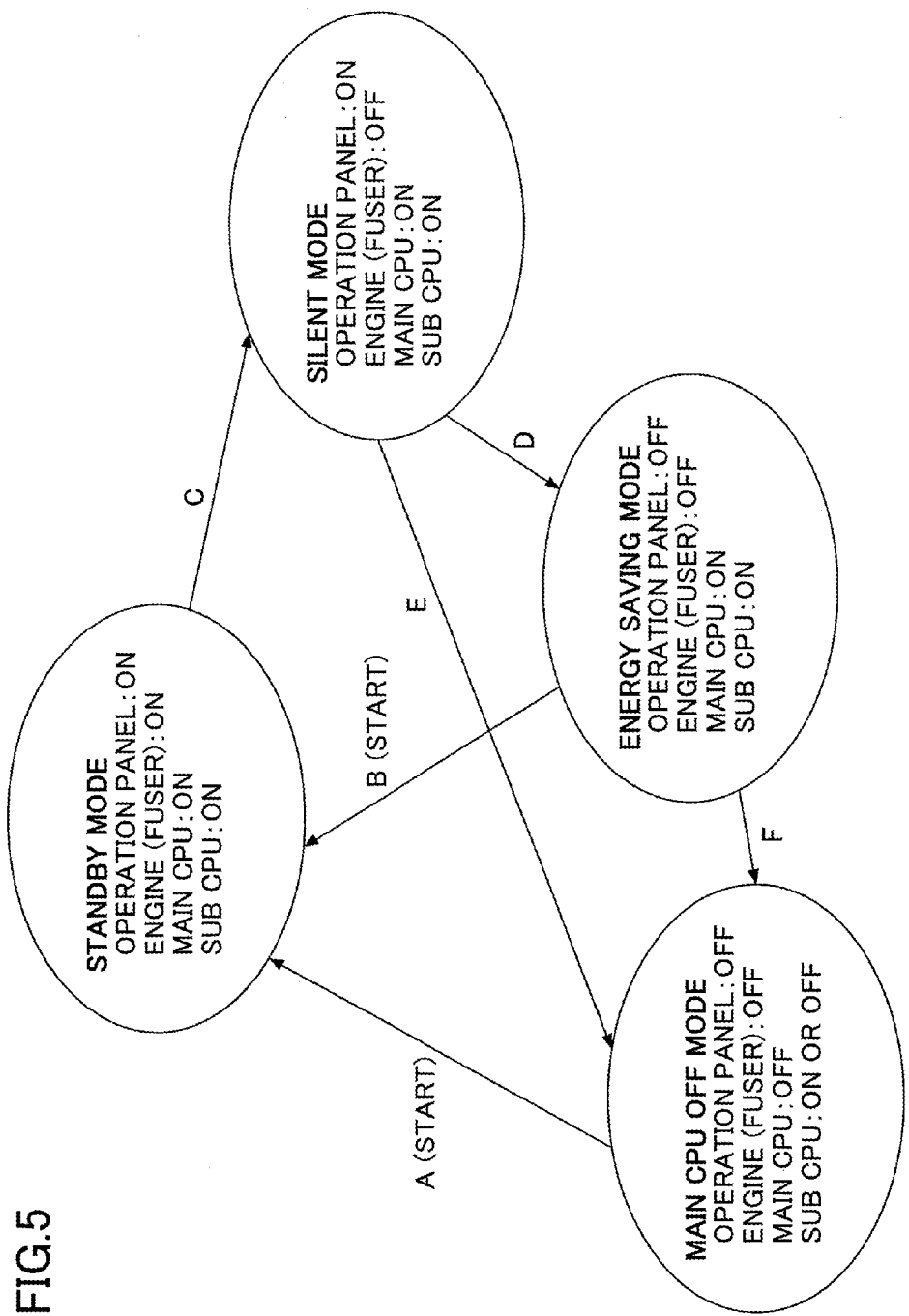
FIG. 5 is a drawing illustrating an example of a set of operation modes for an image forming apparatus according to an embodiment of this invention.

FIG. 5 is a drawing illustrating an example of a set of operation modes for the image forming apparatus 100. FIG. 5 shows four operation modes, however, they are just examples, and types and statuses of the operation modes that the image forming apparatus 100 has may depend on the type of the image forming apparatus 100. In FIG. 5, the operation modes illustrated on the upper side consume higher power. In addition, the power for the operation panel 14 and the operation panel interface 24 may be independently controlled, and corresponding operation mode may be prepared for each state. Hereinafter, explanation is made assuming that both the operation panel 14 and the operation panel interface 24 are powered on at the same time.

Standby Mode (for Executing Printing Job, Etc.)
The operation panel: ON
The engine (fuser): ON
The main CPU: ON
The sub CPU: ON
Silent Mode (a Transitional Mode for Smooth Transition to Standby Mode and Energy Saving Mode)
The operation panel: ON
The engine (fuser): OFF
The main CPU: ON
The sub CPU: ON
Energy Saving Mode (a Lower Consumption Mode while the Main CPU is Turned on)
The operation panel: OFF
The engine (fuser): OFF
The main CPU: ON
The sub CPU: ON
Main CPU OFF Mode (a Lower Consumption Mode while the Main CPU is Turned Off)
The operation panel: OFF
The engine (fuser): OFF
The main CPU: OFF
The sub CPU: ON or OFF The main CPU OFF mode has various kinds of statuses. For example, the sub CPU 26 may become either ON or OFF in the main CPU OFF mode depending on the model or user configuration of the image forming apparatus 100. In addition, the main CPU 21 is OFF while the main power is turned off. Furthermore, when the main CPU 21 is OFF, the main memory 16 may become either ON or OFF. When the main memory 16 is ON, that state is called suspend to RAM (STR) mode. In the STR mode, CPU register statuses are saved in the main memory 16 and other blocks are turned off as much as possible. When the image forming apparatus resumes from the STR mode, the CPU reads the register statuses stored in the main memory 16 so that the OS and applications need not be rebooted and wait time may be reduced.

In the main CPU OFF mode according to this embodiment, the main CPU 21 is OFF. For ease of explanation, regardless of states in the main CPU OFF mode, transition from the main CPU OFF mode to the standby mode is called "startup", and transition from the energy saving mode to the standby mode is called "resume".

A-F shown in FIG. 5 indicate conditions for transition to each operation.

A, B
  Power key: ON, Disabling energy saving key: ON, Film platen: close to open, Document feeder (DF): copy set detected
C
  Enabling energy saving key: ON, Timer timeout, Transition request from external devices
D, E, F
  Timer timeout It is determined in advance whether the image forming apparatus 100 transitions from the silent mode to either the energy saving mode or the main CPU OFF mode. In addition, a transition from the energy saving mode to the main CPU OFF mode is not performed depending on the image forming apparatus 100 or the content of the main CPU OFF mode.

[Functional Block]

Figure 6:
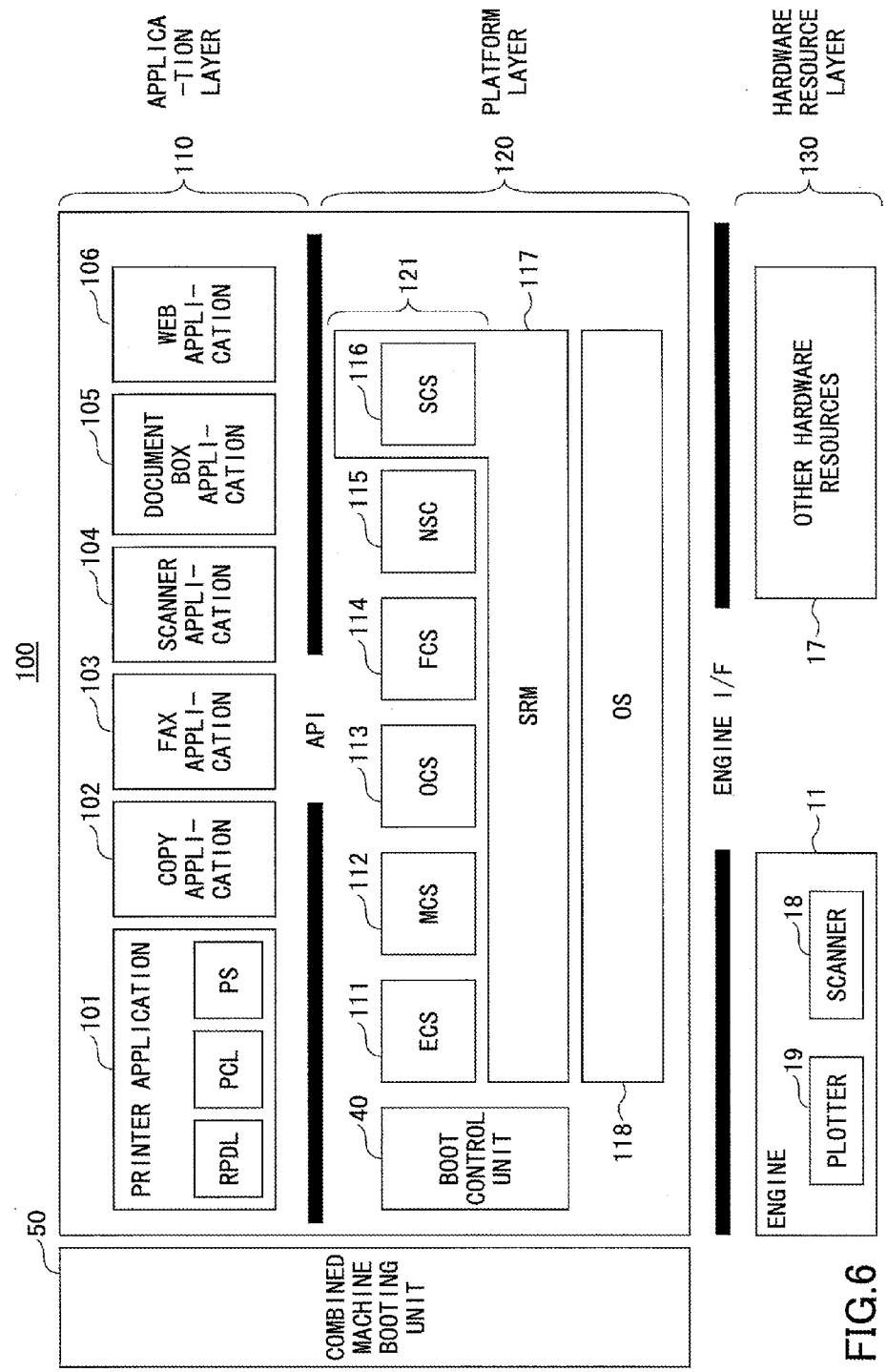
FIG. 6 is a block diagram illustrating a software configuration of an image forming apparatus according to an embodiment of this invention.

FIG. 6 is a block diagram illustrating a software configuration of the image forming apparatus 100. The image forming apparatus 100 has hardware resources 130 as well as software such as a platform layer 120 and an application layer 110. In addition, that is a combined machine booting unit 50 over the platform layer 120 and the application layer 110.

The combined machine booting unit 50 is executed when the main power of the image forming apparatus 100 is turned on, and causes the platform layer 120 and the application layer 110 to start. The combined machine booting unit 50 may be implemented as a BIOS, a bootstrap loader, and an OS loader provided by the OS, and the combined machine booting unit 50 may start the platform layer 120 in a predetermined order. The combined machine booting unit 50 may specify an application to be started by referring to a configuration file 33 as explained below and start each application in the application layer 110.

The platform 120 includes a control service 121 which is divided into some units, a system resource manager (SRM) 117, and the OS 118. The control service 121 interprets a request from the application 110 via an application programming interface and issues a request to acquire hardware sources. The SRM 117 manages the hardware resources and adjusts the request from the control service 121. The OS 118 may be a general-purpose operating system such as UNIX (R) and Linux (R). The OS 118 executes each software program in the platform layer 120 and the application layer 110 as a process in parallel.

The control service 121 has a plurality of service modules including a system control service (SCS) 116, an engine control service (ECS) 111, a memory control service (MCS) 112, an operation panel control service (OCS) 113, a fax control service (FCS) 114, and a network control service (NCS) 115.

The MCS 112 is a process which controls the main memory 16. The MCS 112 controls allocation and re-allocation for the image memory using the HDD 15. The OCS 113 controls the operation panel 14. The FCS 114 controls transmission or receipt of facsimile data. The NCS 115 is a process providing communications via a network interface. The NCS 115 transmits and receives data according to a communication protocol. In particular, the NCS 115 distributes received data for each application and transmits data that the application 110 has requested to send to the network. The ECS 111 controls the hardware resources 130 such as the plotter 19, the scanner 18, the facsimile, etc.

The SRM 117 controls the whole system and manages resources with the SCS 116. The SRM 117 manages a request to the engine 11 (the plotter 19, the scanner 18, etc.), the main memory 16, the HDD 15 and other hardware resources 17 and bridges services. In particular, the SRM 117 determines whether the hardware resource requested is available, and if so, the SRM 117 tells the upper layer the requested resource is available. In addition, the SRM 117 performs scheduling for the hardware resources in response to a request from the upper layer and issues a control request to the hardware.

The SCS 116 performs application management, control of the operation unit (including operations of hardware keys except the operations panel), displaying a system screen, displaying LED, and resource management. The boot control unit 40 controls functions provided by the SCS 116 and the OCS 113 regarding display screens for the application. The boot control unit 40 displays the application selection screen and the UI screen on start up or resume of the image forming apparatus.

The application layer 110 includes the above stated applications 1-3. For example, the applications include a printer application 101, a copy application 102, a fax application 103, a scanner application 104, a document box application 105 and a Web application 106. The printer application 101 has a RPDL, PCL, and Post Script (PS) module for interpreting each page description language. The copy application 102 accepts an execution condition for a copy job and displays copy result and job execution history. The fax application 103 accepts a condition for transmitting a fax and displays transmission result and history. The scanner application 104 accepts a condition for scanning paper and displays scanning result. The document box application 105 accepts an instruction to display and print and transmit a document stored in the HDD 15. The Web application 106 has a function for a browser to access and display a web page according to URL input.

The above applications are started as a process like the application of the platform layer 120. Each application has a unique UI screen and the boot control unit 40 displays the UI screen on the operation panel 14.

[Boot Control Unit]

Figure 7:
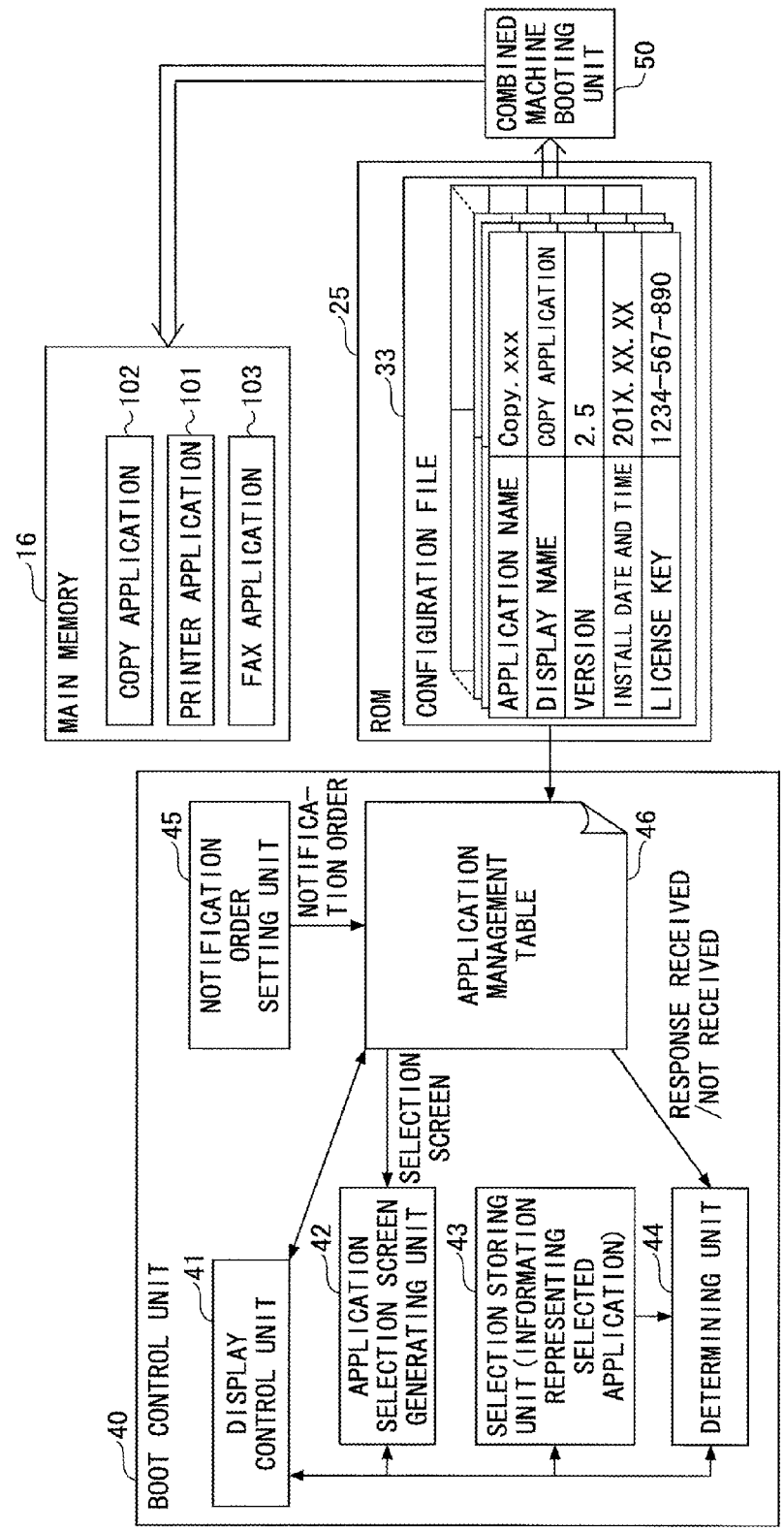
FIG. 7 is a drawing illustrating functions of a boot control unit.

FIG. 7 is a drawing illustrating functions of a boot control unit. The ROM 25 stores the above stated configuration file 33. The configuration file 33 includes, for example, "application name", "display name", "version", "install date and time", and "license key". The "application name" indicates a file name of the application executable. The "display name" indicates a name for users to distinguish an application from others. The "version" indicates a version of the application. The "install date and time" indicates the date and time when the distributed when it is authorized to use the application. The license key enables starting the application. The application layer 110 includes pre-installed applications in the image forming apparatus 100 and applications installed after its shipment. In FIG. 7, both applications are described without distinction and all applications are registered in the configuration file 33. The combined machine booting unit 50 loads the configuration files 33 and specifies an application to be started, the installed location of the application, and the executable of the application.

The boot control unit 40 starts at least earlier than the applications. The boot control unit 40 is always started when the main CPU 21 is turned on. The boot control unit 40 includes a display control unit 41, an application selection screen generating unit 42, a selection storing unit 43, a determination unit 44, and a notification order setting unit 45. The display control unit 41 controls the application UI screen to be displayed on the operation panel 14 on startup or resumption of the image forming apparatus 100. The application selection screen generating unit 42 creates an application selection screen. The selection storing unit 43 keeps information representing an application selected by the user, which is transmitted by the operation panel 14. The determination unit 44 determines that the information representing the selected application corresponds with an application transmitting a response to a "ready to display" notification. The notification order setting unit 45 sets or accepts a setting of an order for transmitting the "ready to display" notification.

The boot control unit 40 refers to the configuration file 33 and creates an application management table 46 responding to a notification from the combined machine booting unit 50. Static data included in the application management table 46 originally created may be stored in the ROM 33. The application management table 46 includes all of the applications for which the screen has to be managed regardless of whether the application has been started or not.

FIG. 8 is a drawing illustrating an example of an application management table. The application management table 46 has fields including "application name", "display name", "selection screen", "start flag", "notification order", and "response to "ready to display" notification". The "application name", "display name", "selection screen", and "notification order" are static information. In addition, the "application name" and "display name" are common with the configuration file 33, which may identify each application.

The "selected screen" field indicates whether the application is displayed on the application selection screen as a menu item and order to be displayed. The application which is not displayed on the application selection screen includes a "-" mark. A unique number is assigned for the order to be displayed in the application selection screen. This number indicates a display position of an application icon (e.g. from upper left). An initial value for the display position is pre-configured before shipping of the image forming apparatus.

The "start flag" field indicates whether the combined machine booting unit 50 has started the application. If started, "start flag" is set to "1", and if not, set to "0". Here, "Starting an application" indicates that the combined machine booting unit 50 reads the application file from the HDD 15, allocates a required area in the main memory 16, and stores the application program in the area. The combined machine booting unit 50 performs the above process for each application. In addition, the OS 118 manages a relationship between the applications and corresponding addresses in the main memory using an address conversion table. The OS 118 switches the address conversion table depending on the application being executed by the main CPU 21 so that the main CPU 21 may access only the area in which the application is stored without understanding where the application is allocated in the main memory 16. The combined machine booting unit 50 notifies the boot control unit 40 of the application started through such procedure or registers the application in the application management table 46.

The "notification order" field indicates order in which the boot control unit 40 transmits the "ready to display" notification to each application. The notification order setting unit 45 configures the notification order. For example, the order is set based on installation date and time of the application (e.g. in chronological or reverse chronological order) or the name of the application (e.g. in A-I-U-E-O or alphabetical order) or set randomly. The user may select such a policy for setting the notification order via the operation panel 14 or a personal computer (PC) connected to a network. Alternatively, the user also may select the notification order at will via the operation panel 14 or the PC connected to the network.

In this embodiment, duration time for displaying an application UI screen used by a user may be reduced by employing a small number as the "notification order" for a frequently-used application.

The "Response to a "ready to display" notification" field indicates whether the boot control unit 40 receives a response to a "ready to display" notification from an application or not. If so, "received" is registered in the field.

FIG. 9A is a drawing illustrating an example of an application selection screen. In response to an instruction from the display control unit 41, the application selection screen generating unit 42 creates the application selection screen to choose one of the applications whose numbers are registered in the "selection screen" field in application management table 46. In particular, the application selection screen generating unit 42 loads, using the application name indicated in the application management table 46, an image icon, a name (i.e. display name), a display position (e.g. the number shown in "selection screen" field and the icon relates to the position) etc., for each application. The boot control unit 40 keeps such information in advance so that the application selection screen generating unit may obtain the information even if the application has not started.

FIG. 9A shows three application icons—"Copy", "Fax", and "Printer". As explained about the "selection screen" field in the application management table 46, applications shown in the application selection screen are determined in advance, but the user may change them and their position at will. For applications which are specified by the user not to be shown, "-" marks are shown in the "selection screen" field, otherwise the number is registered. In addition, the user may change the display position of the application by dragging the application icon. The number shown in "selection field" field is updated according to the change of the position. The OCS 113 compares the display position of the application with a position where the user touches on the operation panel 14 and identifies the application that the user selected to start.

When the "selection screen" field in the application management table 46 is updated, the notification order setting unit 45 updates the "notification order" field so that applications to be displayed may preferentially receive the "ready to display" notification. For example, the notification order setting unit 45 may set the last "notification order" for the application removed from the application selection screen by the user. In addition, the notification order setting unit 45 may move forward "notification order" of applications, which has been later than the removed application. Furthermore, the notification order setting unit 45 may set the last "notification order" in displayed application for the application newly added to the application selection screen by the user. The notification order setting unit 45 may move backward "notification order" of the application not to be shown. In this way, the boot control unit 40 may preferentially transmit the "ready to display" notification to the application shown in the application selection screen.

Figure 9B:
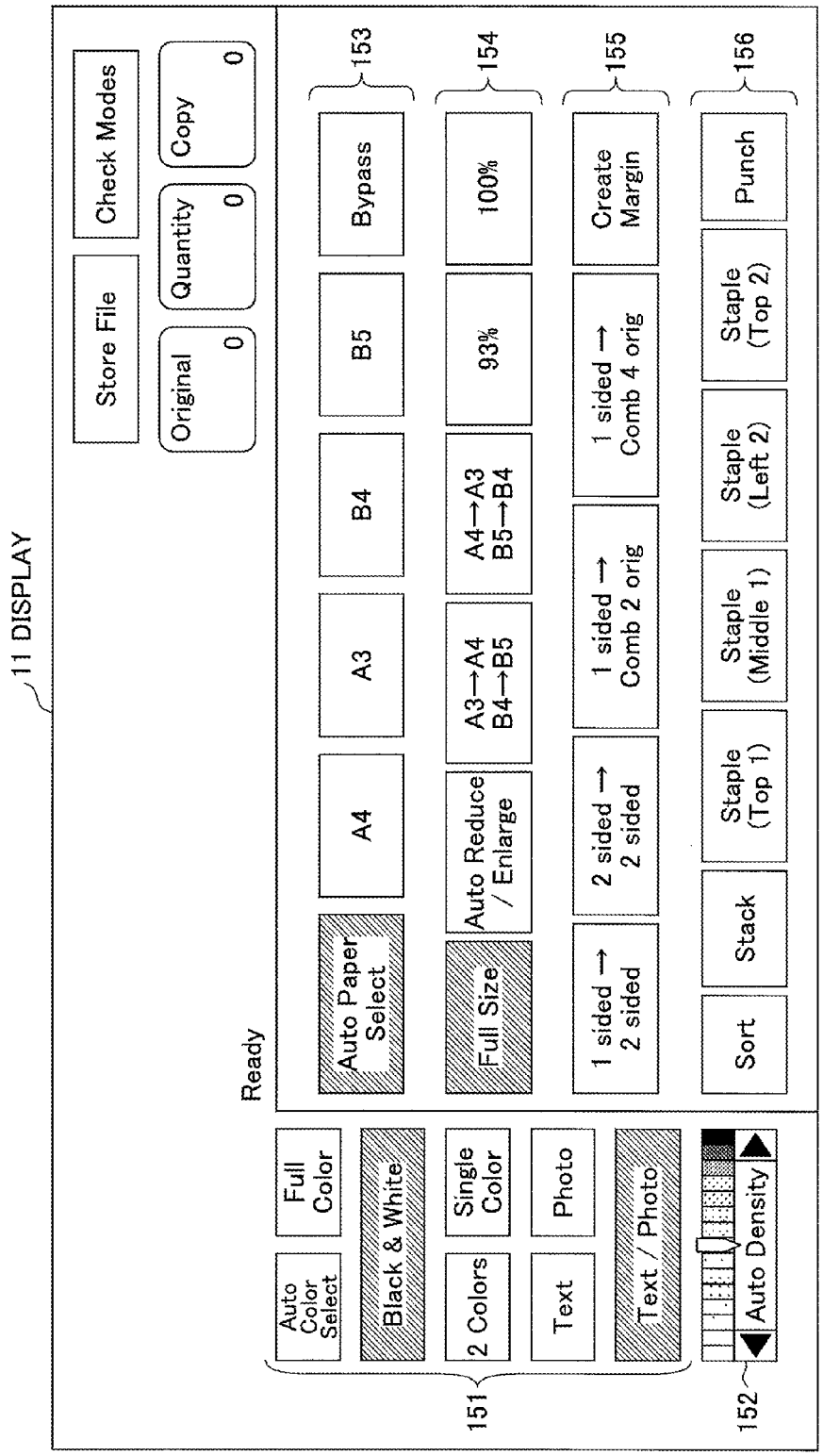
FIG. 9B is a drawing illustrating an example of an application selection screen.

FIG. 9B is a drawing illustrating an example of a UI screen of a copy application 102. The UI screen of the copy application 102 includes a selection for paper types 151, a selection for density 152, a selection of paper 153, a selection for variable magnification 154, a selection for modification 155, a selection for finishers 156, etc. The user may configure conditions for copy on the UI screen. The printer application 101 and the fax application 103 also creates the UI screen to configure conditions depending on each application and show the UI screen on the operation panel 14.

[Sequence for Displaying a UI Screen of an Application]
<Conventional Sequence>

Figure 10:
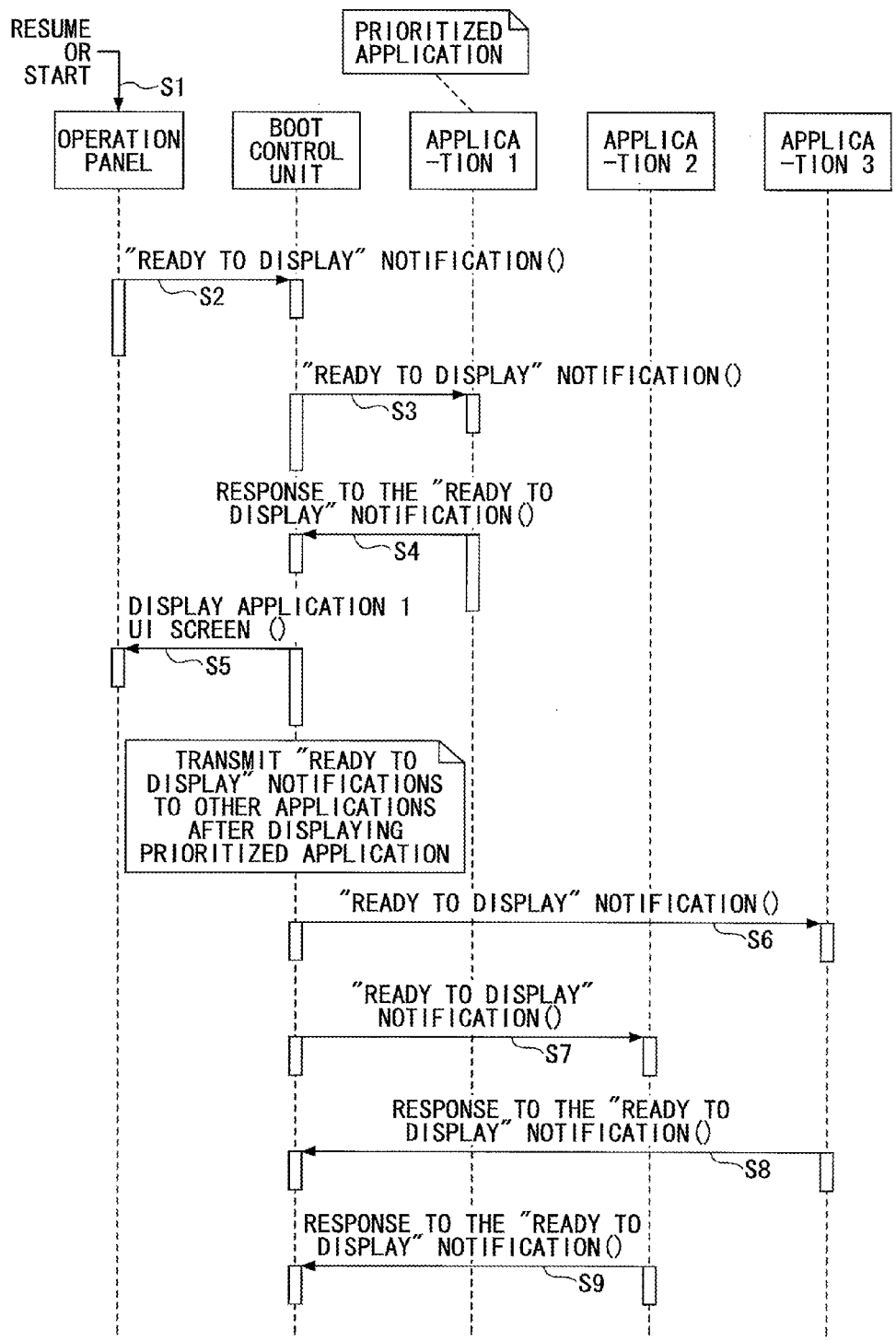
FIG. 10 is a sequence chart illustrating a process performed by an image forming apparatus to display a UI screen of an application (prior art)

FIG. 10 is a sequence chart illustrating a process performed by an image forming apparatus 100 to display a UI screen of an application. In FIG. 10, Application 1 is the prioritized application which is displayed on the operation panel 14 when the image forming apparatus 100 starts or resumes. Here, the image forming apparatus 100 is in either the energy saving mode or the main CPU OFF mode.

S1: When the image forming apparatus 100 starts or resumes, the operation panel 14 is turned on.

S2: The operation panel 14 which is turned on transmits a "ready to display" notification to the boot control unit 40.

S3: Since the application 1 is the prioritized application, the boot control unit 40 transmits a "ready to display" notification to the application 1. Since the boot control unit 40 transmits to the application 1 which is displayed first the notification in advance (i.e. the boot control unit 40 delays transmission of notifications to other applications), waiting time for user operations is reduced.

S4: When the application has started, the application 1 transmits to the boot control unit 40 a response to the "ready to display" notification S5: The boot control unit 40 detects, by receiving the response to the "ready to display" notification, that the application 1 is ready to display the UI screen, and the boot control unit 40 displays the UI screen of the application 1 on the operation panel 14. Thus, the UI screen of the application 1 may be displayed in a short time.

S6: After displaying the UI screen of the prioritized application, the boot control unit 40 transmits "ready to display" notifications to other applications. In FIG. 10, the boot control unit 40 transmits the "ready to display" notification to the application 3.

S7: The application 3 transmits to the boot control unit 40 a response to the "ready to display" notification.

S8: The boot control unit 40 transmits a "ready to display" notification to the application 2.

S9: The application 2 transmits to the boot control unit 40 a response to the "ready to display" notification.

In this way, the UI screen of the prioritized application 1 is displayed first. However, when the user selects the application 2 or 3, the UI screen of the application 1 is being displayed. Thus, regarding the application 2 or 3 (i.e. non-prioritized application), waiting time is likely to increase.

<Sequence of the Present Embodiment>

Figure 11:
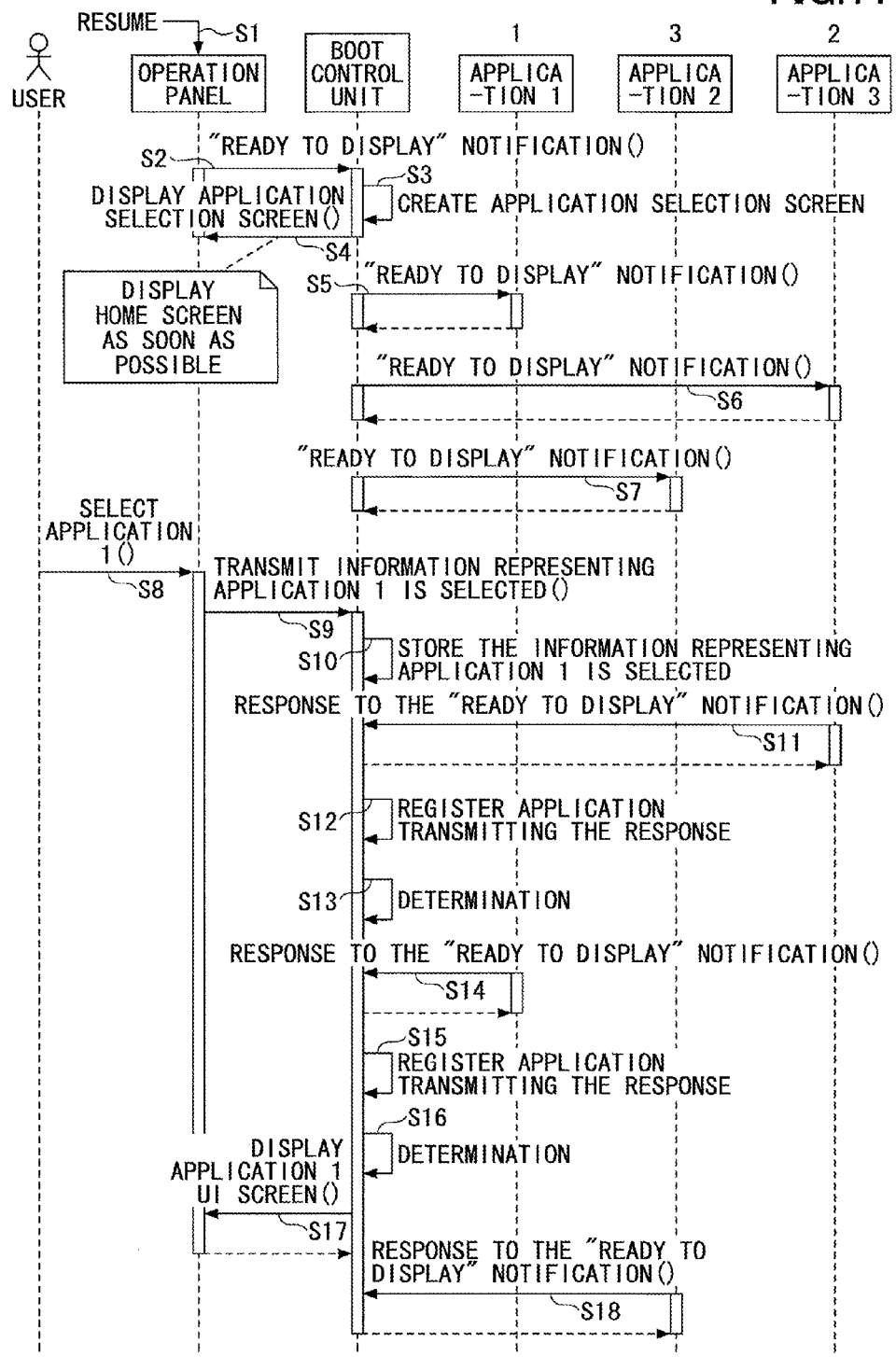
FIG. 11 is a sequence chart illustrating a process performed by an image forming apparatus according to an embodiment to display a UI screen of an application.

FIG. 11 is a sequence chart illustrating a process performed by the image forming apparatus 100 to display a UI screen of an application. In FIG. 11, it is assumed that, "notification order" registered in the application management table 46 for the application 1 is 1, for the application 3 is 2, and for the application 2 is 3. Here, the image forming apparatus 100 is in the energy saving mode.

S1: When the image forming apparatus 100 resumes, the operation panel 14 is turned on.

S2: The operation panel 14 which has been turned on transmits a "ready to display" notification to the boot control unit 40. The "ready to display" notification means that the operation panel 14 is ready to display a screen for the application as well as that the operation panel 14 has been turned on and requests the screen for the application.

S3: When the display control unit 41 receives the "ready to display" notification from the operation panel 14, in order to transmit the application selection screen, the display control unit 41 causes the application selection screen generating unit 42 to create the application selection screen. The application selection screen generating unit 42 refers to the "selection screen" field in the application management table 46, identifies applications to be displayed on the application selection screen, determines their positions, and creates the application selection screen.

S4: Since the boot control unit 40 transmits the application selection screen to the operation panel 14, the operation panel 14 displays the application selection screen. In this way, since the boot control unit 40 displays the application selection screen as soon as possible, the user is likely to feel that starting-up of the image forming apparatus 100 is quick (or waiting time is short).

S5: The display control unit 41 refers to the "notification order" field in the application management table 46 and transmits "ready to display" notifications to the applications in order. First, the display control unit 41 transmits the notification to the application 1. In particular, the display control unit 41 may include the "ready to display" notification in an argument to call the application 1. The "ready to display" notification is stored in a stack area so that the application 1 may obtain the "ready to display" notification.

S6: The display control unit 41 transmits a "ready to display" notification to the application 3.

S7: The display control unit 41 transmits a "ready to display" notification to the application 2.

S8: The user selects the application 1 on the application selection screen.

S9: The operation panel 14 transmits information representing that the application 1 is selected to the boot control unit 40.

S10: When the boot control unit 40 receives the information representing that the application 1 is selected, the display control unit 41 causes the selection storing unit 43 to store the information representing that the application 1 is selected.

S11: The applications 1-3 which have received the "ready to display" notifications create (or prepare for creating) UI screens. However, the order to finish creating the UI screens does not depend on the order to have received the "ready to display" notifications. This is because the order is affected by time to switch controls for each application or performance of each application. Thus, the applications 1-3 transmit responses to the "ready to display" notifications to the boot control unit 40 after completing creation (or preparation for creation) of the UI screens. In FIG. 11, the application 3 first transmits the response to the "ready to display" notification to the boot control unit 40.

S12: The display control unit 41 registers the application, which has transmitted the response to the "ready to display" notification, in the "response to "ready to display" notification" field in the application management table 46. Thus, the "response to "ready to display" notification" field for the application 3 which has transmitted the "response to "ready to display" notification" becomes "received".

S13: The determining unit 44 determines whether the application indicated in the information representing the application 1 is selected, which is stored by the selection storing unit 43 when the response to the "ready to display" notification is received, is identical with the application which has transmitted the response to the "ready to display" notification. If so, the determining unit 44 transmits the UI screen of the application. At the S13, the determining unit 44 determines that both applications are not identical because the information representing the application 1 is selected indicates the application 1 but the application 3 has transmitted the response to the "ready to display" notification.

S14: The application 1 transmits a response to the "ready to display" notification to the boot control unit 40.

S15: The display control unit 41 registers the application 1, which has transmitted the response to the "ready to display" notification, to the "response to "ready to display" notification" field in the application management table 46.

S16: The determining unit 44 determines whether the application indicated in the information representing the application 1 is selected, which is stored by the selection storing unit 43 when the response to the "ready to display" notification is received, is identical with the application which has transmitted the response to the "ready to display" notification. At the S16, the determining unit 44 determines that both applications are identical because the information representing the application 1 is selected indicates the application 1 and the application 1 has transmitted the response to the "ready to display" notification.

S17: Since the determining unit 44 determines both application are identical, the display control unit 41 displays the UI screen of the application 1 on the operation panel 14. Thus, the operation panel may display the UI screen of the application 1 soon after the application 1 finishes preparing the UI screen.

S18: The application 2 transmits a response to the "ready to display" notification to the boot control unit 40. The subsequent steps are in common with the application 3.

In this way, the image forming apparatus 100 in this embodiment may display the application selection screen soon after the resumption, and the user is likely to feel that waiting time is short. In addition, since the image forming apparatus 100 remembers which application is selected by the user, even if the application is not ready to display the UI screen when the user have selected the application, the image forming apparatus 100 may display the UI screen of the application selected by the user soon after the application is ready to display the UI screen. The user need not select the application again until the application is ready to display the UI screen.

Figure 12:
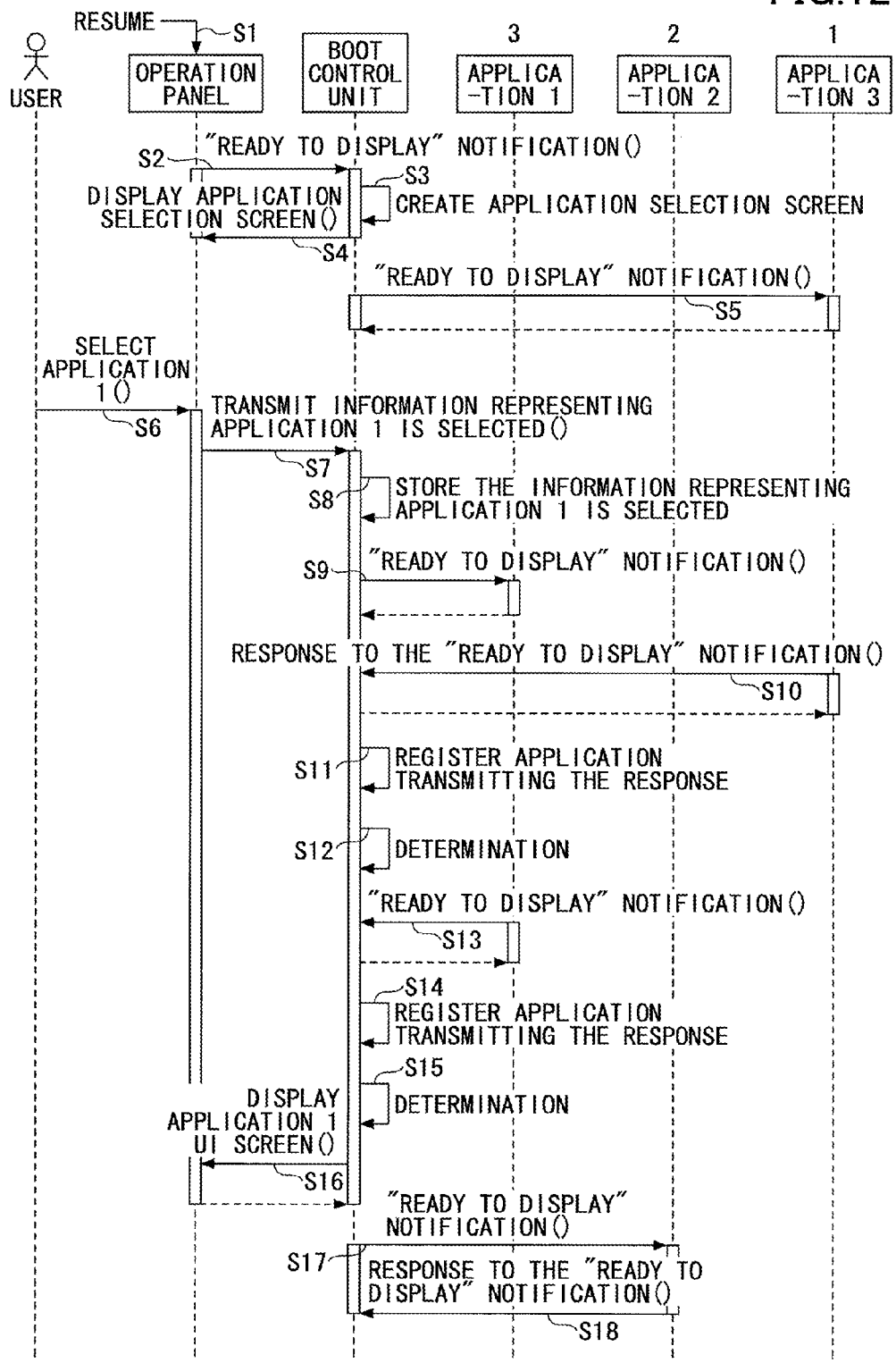
FIG. 12 is a sequence chart illustrating an alternative process performed by an image forming apparatus according to an embodiment to display a UI screen of an application.

Next, a sequence is explained when timing of user's selection is different from the above case. FIG. 12 is a sequence chart illustrating an alternative process performed by the image forming apparatus 100 to display a UI screen of an application. The difference may be mainly discussed for the similar steps as shown in FIG. 11. In FIG. 12, it is assumed that the "notification order" registered in the application management table 46 is "1" for the application 3, "2" for the application 2, and "3" for the application 1. Here, the image forming apparatus 100 is in the energy saving mode.

S1: When the image forming apparatus 100 resumes, the operation panel 14 is turned on.

S2: The operation panel 14 which has been turned on transmits a "ready to display" notification to the boot control unit 40.

S3: When the display control unit 41 receives the "ready to display" notification from the operation panel 14, in order to transmit the application selection screen, the display control unit 41 causes the application selection screen generating unit 42 to create the application selection screen. The application selection screen generating unit 42 refers to the "selection screen" field in the application management table 46, identifies applications to be displayed on the application selection screen, determines the their positions, and creates the application selection screen.

S4: Since the boot control unit 40 transmits the application selection screen to the operation panel 14, the operation panel 14 displays the application selection screen. In this way, since the boot control unit 40 displays the application selection screen as soon as possible, the user is likely to feel that starting-up of the image forming apparatus 100 is quick (or waiting time is short).

S5: The display control unit 41 refers to the "notification order" field in the application management table 46 and transmits "ready to display" notifications to the applications in order. First, the display control unit 41 transmits the notification to the application 3.

S6: The user selects the application 1 on the application selection screen.

S7: The operation panel 14 transmits information representing the application 1 is selected to the boot control unit 40.

S8: When the boot control unit 40 receives the information representing the application 1 is selected, the display control unit 41 causes the selection storing unit 43 to store the information representing the application 1 is selected.

S9: Since the application 1 is selected, the display control unit 41 prepares the UI screen of the application 1 preferentially. When the display control unit 41 receives information representing the application 1 is selected before transmitting the "ready to display" notification to all of the applications, the display control unit 41 causes the application 1 to create the UI screen. Therefore, although the "notification order" in the application management table 46 indicates the application 3, the application 2, and the application 1 in order, the display control unit 41 gives higher priority to the application 1 than the application 2.

S10: The application 3, which has received the "ready to display" notification, creates (or prepares to create) the UI screen and transmits a response to the "ready to display" notification to the boot control unit 40.

S11: The display control unit 41 registers the application, which has transmitted the response to the "ready to display" notification, in the "response to "ready to display" notification" field in the application management table 46. Thus, the "response to "ready to display" notification" field for the application 3 which has transmitted the "response to "ready to display" notification" becomes "received".

S12: The determining unit 44 determines whether the application indicated in the information representing the application 1 is selected, which is stored by the selection storing unit 43 when the response to the "ready to display" notification is received, is identical with the application which has transmitted the response to the "ready to display" notification. If so, the determining unit 44 transmits the UI screen of the application. At the S13, the determining unit 44 determines that both applications are not identical because the information representing the application 1 is selected indicates the application 1 but the application 3 has transmitted the response to the "ready to display" notification.

S13: The application 1 transmits a response to the "ready to display" notification to the boot control unit 40.

S14: The display control unit 41 registers the application 1, which has transmitted the response to the "ready to display" notification, to the "response to "ready to display" notification" field in the application management table 46.

S15: The determining unit 44 determines whether the application indicated in the information representing the application 1 is selected, which is stored by the selection storing unit 43 when the response to the "ready to display" notification is received, is identical with the application which has transmitted the response to the "ready to display" notification. At the S15, the determining unit 44 determines that both applications are identical because the information representing the application 1 is selected indicates the application 1 and the application 1 has transmitted the response to the "ready to display" notification.

S16: The display control unit 41 displays the UI screen of the application 1 on the operation panel 14. Thus, the operation panel 14 may display the UI screen of the application 1 soon after the application 1 finishes preparing the UI screen.

S17: Next the display control unit 41 transmits a "ready to display" notification to the application 2. Thus, the display control unit 41 transmits the notification to the application 2, which has not received the notification, after displaying the UI screen of the prioritized application 1.

S18: The application 2 transmits a response to the "ready to display" notification to the boot control unit 40. The subsequent steps are in common with the application 3.

In this way, the image forming apparatus 100 in this embodiment may display the application selection screen soon after the resumption like the sequence as shown in FIG. 11. In addition, since the UI screen of the application selected by the user may be created first regardless of the "notification order", when the user selects the application in advance, the UI screen of the selected application may be displayed first.

In both cases shown in FIGS. 10, 11, the application 1 transmits the response to the "ready to display" notification later than the user's selection of the application. However, the user may select the application 1 after the application has transmitted the response to the "ready to display" notification. Also in this case, since the "Response to a "ready to display" notification" field for the application 1 indicates "received", soon after the user selects the application 1, the display control unit 41 may display the UI screen of the application 1 on the operation panel 14.

<In a Case where an Application is Selected Before its Start-Up>

In this embodiment, waiting time to display the UI screen of the application used by the user may be reduced after the main power of the image forming apparatus 100 is turned on.

Figure 13A:
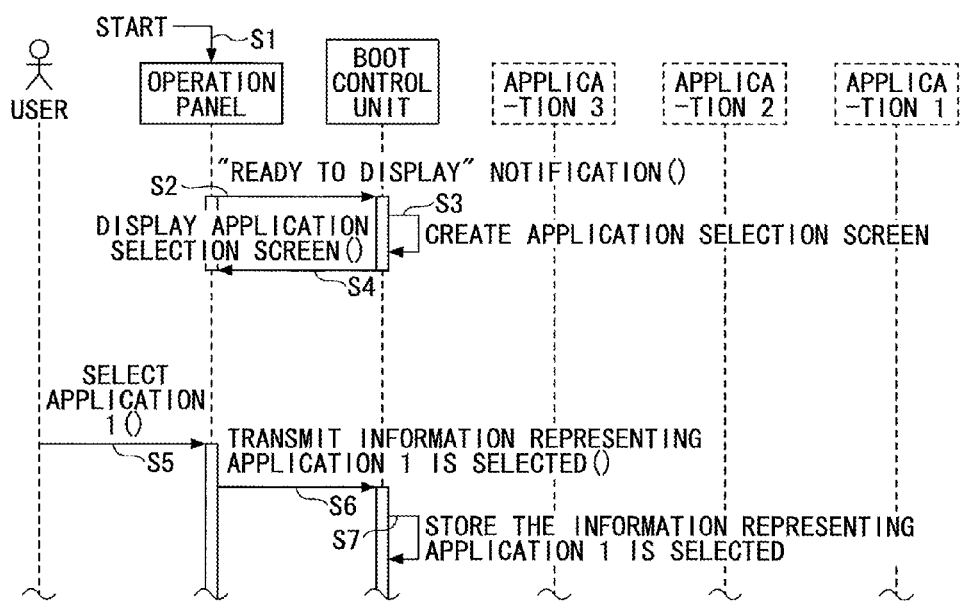
FIG. 13A is a sequence chart illustrating a process performed by an image forming apparatus according to an embodiment to display a UI screen of an application on start-up.
Figure 13B:
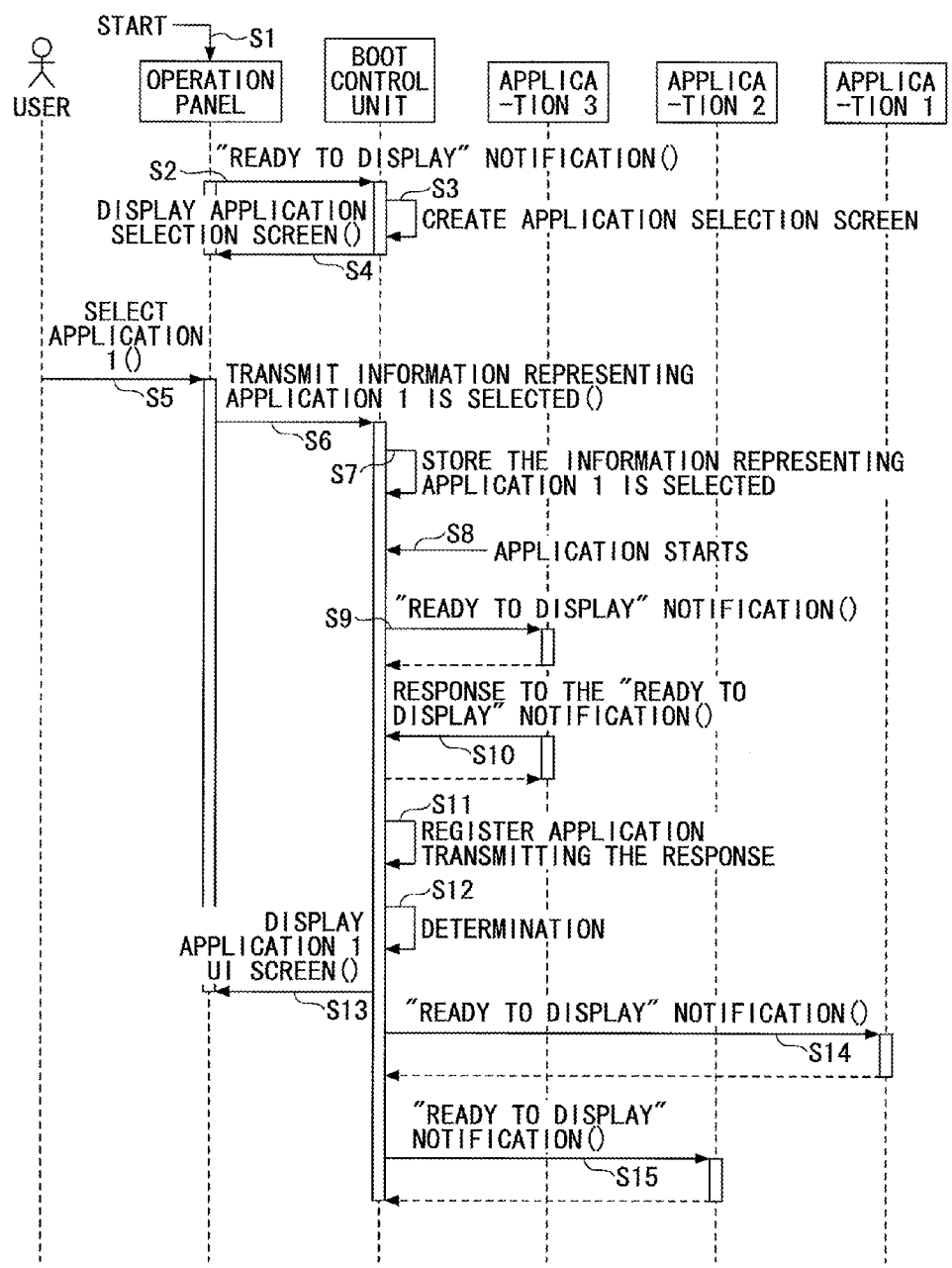
FIG. 13B is a sequence chart illustrating a process performed by an image forming apparatus according to an embodiment to display a UI screen of an application on start-up.

FIGS. 13A, 13B are sequence charts illustrating processes performed by the image forming apparatus 100 to display a UI screen of an application on start-up. In FIG. 13A, it is assumed that the "notification order" registered in the application management table 46 is "1" for the application 3, "2" for the application 2, and "1" for the application 1. In addition, the image forming apparatus 100 is in the main CPU off mode, and the applications 1-3 are not started by the combined machine booting unit 50.

S1: When the image forming apparatus 100 starts, the operation panel 14 is turned on. In addition, the platform layer 120 including the OS 118 starts before the applications 1-3.

S2: The operation panel 14 which has been turned on transmits a "ready to display" notification to the boot control unit 40.

S3: When the display control unit 41 receives the "ready to display" notification from the operation panel 14, in order to transmit the application selection screen, the display control unit 41 causes the application selection screen generating unit 42 to create the application selection screen. The application selection screen generating unit 42 refers to the "selection screen" field in the application management table 46, identifies applications to be displayed on the application selection screen, determines the their positions, and creates the application selection screen.

S4: Since the boot control unit 40 transmits the application selection screen to the operation panel 14, the operation panel 14 displays the application selection screen. In this way, since the boot control unit 40 displays the application selection screen as soon as possible, the user is likely to feel that the image forming apparatus 100 starts quickly (or waiting time is short).

S5: The user selects the application 1 on the application selection screen.

S6: The operation panel 14 transmits information representing that the application 1 is selected to the boot control unit 40.

S7: When the boot control unit 40 receives the information representing that the application 1 is selected, the display control unit 41 causes the selection storing unit 43 to store the information representing that the application 1 is selected. However, since not any of the applications 1-3 have started yet, the boot control unit 40 may not transmit "ready to display" notifications. In this case, the boot control unit 40 may wait for start-up of the application 1 selected by the user. The start-up may be detected by the "start flag". In addition, even if the applications 2, 3 have started in advance, the boot control unit 40 does not transmit the "ready to display" notifications in order to give priority to the application 1.

S8: As shown in FIG. 13B, when the application 1 starts, since the combined machine booting unit 50 registers its start-up in the application management table 46 ("start flag" turns to the boot control unit 40 may detect that the application 1 starts.

S9: The display control unit 41 loads information representing that the application 1 is selected, which is stored in the selection storing unit 43 and prepares the UI screen of the application 1 preferentially. Thus, the control unit 41 gives priority to the application 1 than the applications 2, 3 regardless of the "notification order". The application 1 which receives a "ready to display" notification creates (or prepares to create) the UI screen.

S10: The application 1 transmits a response to the "ready to display" notification to the boot control unit 40.

S11: The display control unit 41 registers the application 1, which has transmitted the response to the "ready to display" notification, in the "response to "ready to display" notification" field in the application management table 46. Thus, the "response to "ready to display" notification" field for the application 1 which has transmitted the "response to "ready to display" notification" becomes "received".

S12: The determining unit 44 determines that the application indicated in the information representing that the application 1 is selected, which is stored by the selection storing unit 43 when the response to the "ready to display" notification is received, is identical with the application which has transmitted the response to the "ready to display" notification. At the S12, the determining unit 44 determines that both applications are identical because the information representing that the application 1 is selected indicates the application 1 and the application 1 has transmitted the response to the "ready to display" notification.

S13: The boot control unit 40 displays the UI screen of the application 1 on the operation panel 14. Thus, the display control unit 41 may display the UI screen of the application 1 soon after the application 1 finishes preparing the UI screen.

After that, the boot control unit 40 transmits "ready to display" notifications to the applications 2, 3.

Since the application selection screen may be displayed even if the application has not started, the user is likely to feel that waiting time is short. In addition, the image forming apparatus 100 keeps, before the application starts, information representing the application selected by the user. Thus, even if the application is not ready to display the UI screen when the user selects the application, just after the application is ready to display the UI screen, the image forming apparatus 100 may display the UI screen of the application selected by the user. The user need not select the application again until the application is ready to display the UI screen.

[Second Embodiment]

In this embodiment, the image forming system 300 is explained, which may control the UI screen of the applications in common with the first embodiment except that the operation panel 14 is a movable device.

Figure 14:
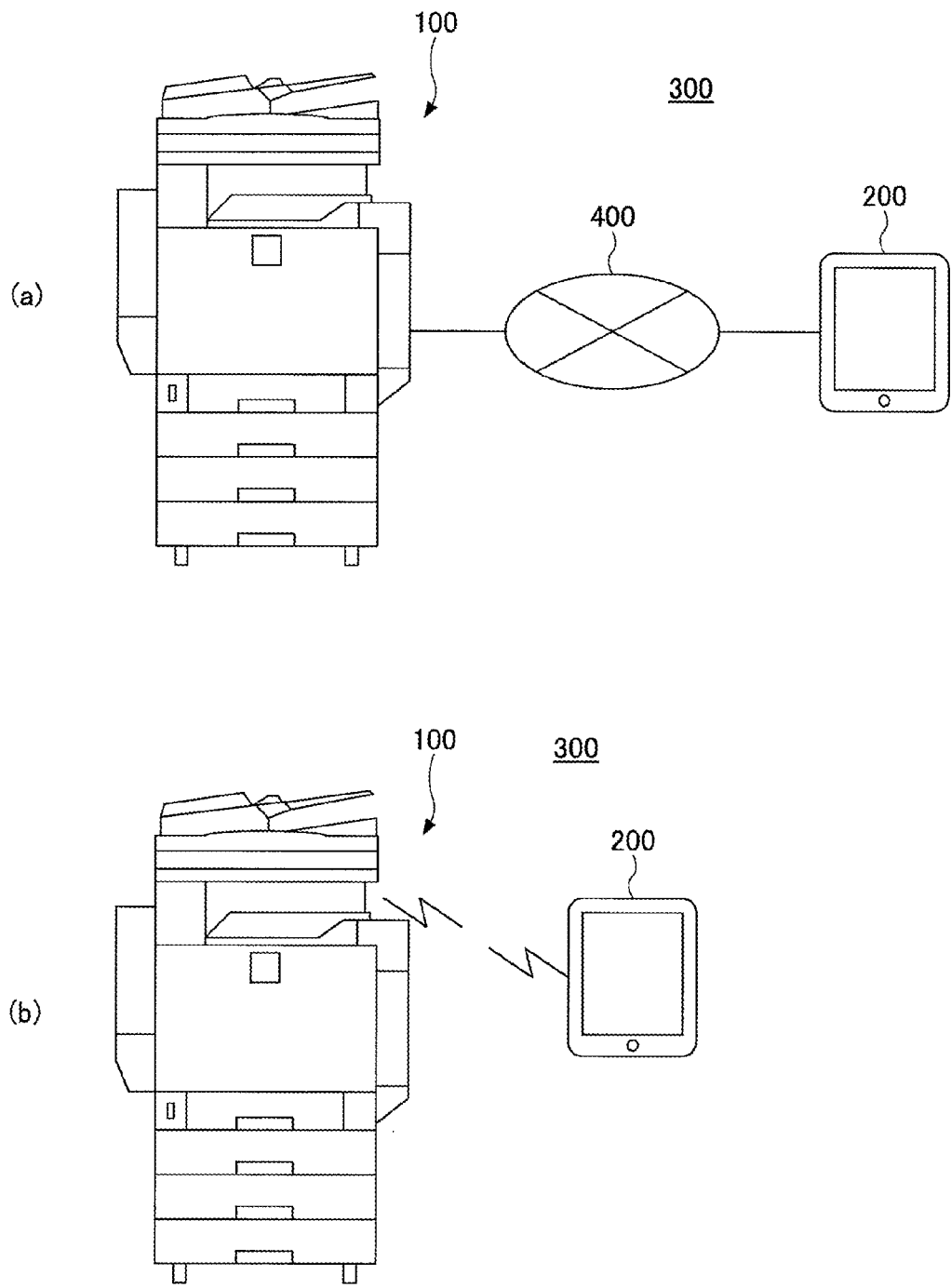
FIG. 14 is a drawing illustrating an overview of a configuration of an image forming system according to an embodiment of this invention.

FIG. 14 is a drawing illustrating an overview of a configuration of the image forming system 300. In FIG. 14 (a), the image forming apparatus 100 and a terminal 200 are connected via a network 400, and in FIG. 14 (b), both devices are connected directly. The network 400 may be a LAN or WAN. In addition, parts or all of the network 400 may include a wireless network. The direct connection as shown in FIG. 14(b) may be implemented with an ad-hoc mode according to a wireless LAN standard or a Bluetooth (r), ZigBee (r), or IC communication standard.

The terminal 100 is preferably an information processing apparatus including a display device such as a tablet, a smartphone, a personal digital assistant (PDA), a mobile phone, etc. The image forming apparatus 100 may display the application selection screen and the UI screen on the display device.

In particular, when the user, who is carrying the terminal 200, approaches a location where the image forming apparatus 100 is placed, the image forming apparatus 100 may detect that with wireless communications started automatically or in response to an explicit operation by the user. The user operates the terminal 200 while the user places the terminal 200 on a predetermined position of the image forming apparatus 100 or holds the terminal 200 in hand when no place is provided.

When the image forming apparatus 100 may communicate with the terminal 200, the image forming apparatus 100 transmits a screen to the terminal 200. In this case, the image forming apparatus 100 may not transmit the screen to the operation panel 14. When the image forming apparatus 100 transmits the screen to the terminal 200, the image forming apparatus 100 accepts operations performed on the terminal 200 preferentially.

Thus, the user may operate the terminal 200 as is the case in using the operation panel 14. The image forming apparatus 100 may resume or start in a way similar to that of the first embodiment. However, in this embodiment, the image forming apparatus 100 may resume operations in response to the communication with the terminal 200.

Figure 15:
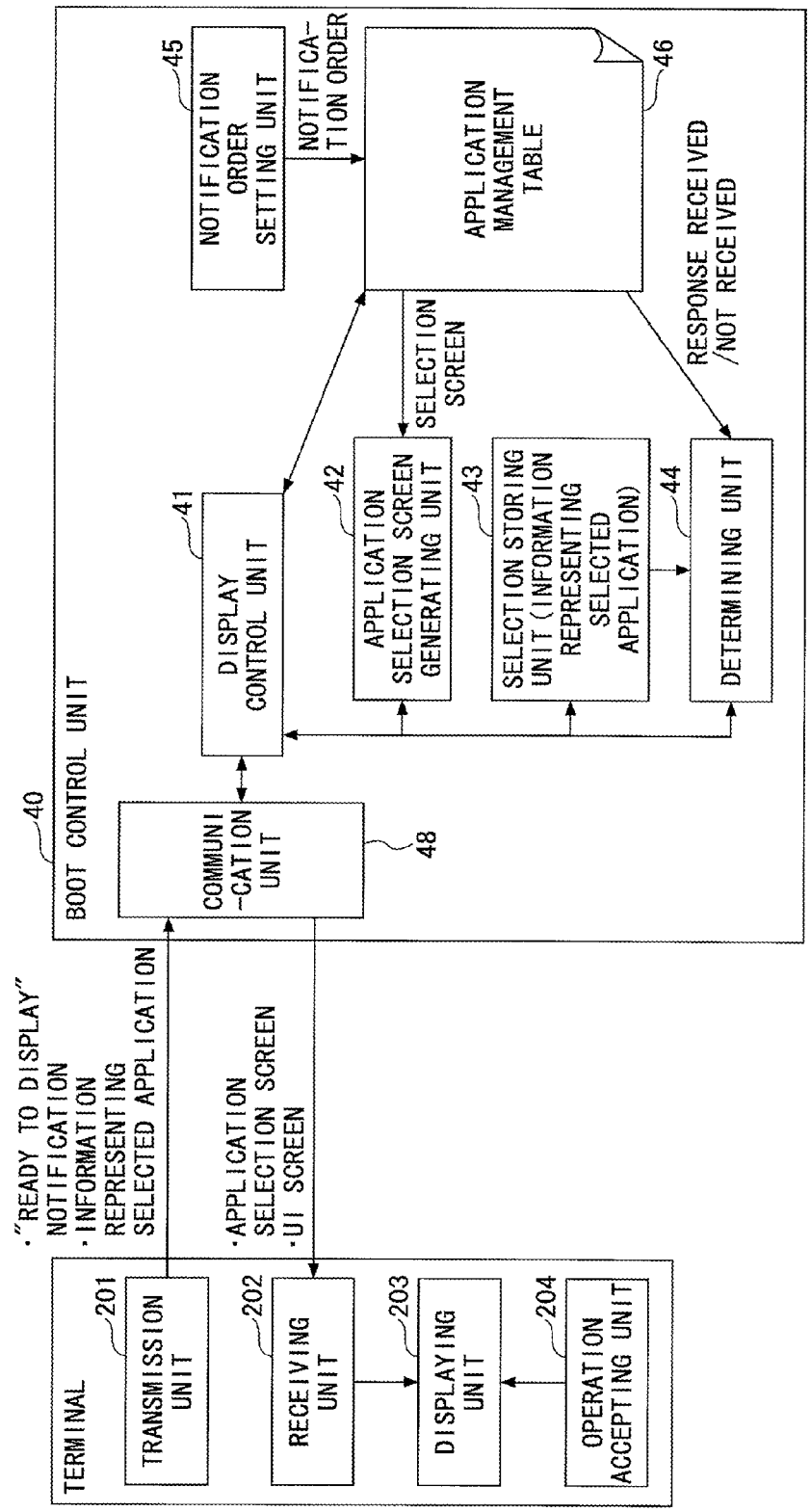
FIG. 15 is a block diagram illustrating exemplary functional configurations of an image forming system according to an embodiment of this invention.

FIG. 15 is a block diagram illustrating exemplary functional configurations of the image forming system. The image forming apparatus 100 has a communication unit 48 to communicate with the terminal 200 in addition to the function of the boot control unit 40. The terminal 200 has a transmission unit 201, a receiving unit 202, a display unit 203, and an operation accepting unit 204.

The image forming apparatus 100 which has resumed or started estimates a connection with the terminal 200 automatically or in response to the user operation. After that, as is the case in the operation panel 14, the image forming apparatus 100 displays an application selection screen and a UI screen and may receive information representing which application the user selected.

That is, after estimation of the connection, the transmission unit 201 of the terminal 200 transmits a "ready to display" notification to the image forming apparatus 100. The image forming apparatus 100 transmits the application selection screen to the terminal 200.

The receiving unit 202 of the terminal 200 receives the application selection screen, and the display unit 203 displays the application selection screen. After that, when the user selects an application at any time, the transmission unit 201 transmits to the image forming apparatus 100 the information representing which application is selected.

The image forming apparatus 100 holds the information representing which application is selected by the user. When the selected application outputs a response to the "ready to display" notification, the image forming apparatus 100 transmits a UI screen of the application to the terminal 200. The receiving unit 202 of the terminal 200 receives the UI screen, and the display unit 203 displays the UI screen.

In this way, the terminal 200 communicates with the image forming apparatus 100 and may display the UI screen of the image forming apparatus 100.

The present application is based upon and claims the benefit of priority of Japanese Patent Application No. 2012-281304 filed on Dec. 25, 2012, the entire contents of which are incorporated herein by reference.

PATENT DOCUMENT

[Patent Document 1] Japanese Laid-open Patent Publication No. 2010-079566

What is claimed is:

1. An information processing apparatus which has a first operation mode and a second operation mode in which a display on the information processing apparatus is turned off and power consumption is lower than that of the first operation mode, comprising:
a processor; and
storage storing instructions that, when executed by the processor, cause the processor to,
transmit a notification at a time when the information processing apparatus switches from the second operation mode to the first operation mode,
accept, through an application selection screen, a selection of an application,
generate, in response to the notification received from the display unit, the application selection screen through which the application can be selected,
initiate generation of a plurality of application UI screens such that the initiation takes place after the transmission of the notification and before the acceptance of the selection of the application through the application selection screen, the plurality of application UI screens corresponding to a plurality of applications, respectively, the plurality of application UI screens including options for altering attributes of the applications corresponding to the application UI screens, respectively,
determine whether or not the selected application is a first application, from among the plurality of applications, and
display a first application UI screen, from among the plurality of application UI screens, when the selected application is determined to be the first application, the first application being the application corresponding to the first application UI screen.

2. The information processing apparatus as claimed in claim 1, wherein the instructions, when executed by the processor, further cause the processor to
form an image on paper, and
create the second screen which accepts configuration information about conditions for the image forming.

3. The information processing apparatus as claimed in claim 1, wherein
the terminal is configured to display a screen based on the selection accepted by the operation accepting unit, and
the information processing apparatus is configured to cause the terminal to display the generated application selection screen on the terminal when the notification is sent from the terminal, and cause the terminal to display the first application UI screen when the selection of the first application is received.

4. The information processing apparatus as claimed in claim 1, wherein
the plurality of applications are application software that is executable by the information processing apparatus.

5. The information processing apparatus as claimed in claim 4, wherein the instructions, when executed by the processor, cause the processor to operate such that,
when the selection of the first application is received, and the generation of the first application UI screen is not completed,
the processor displays the first application UI screen when the generation of the first application UI screen is completed.

6. A non-transitory computer-readable storage medium storing program code for causing an information processing apparatus to perform a process, wherein the information processing apparatus has a first operation mode and a second operation mode in which a display on the information processing apparatus is turned off and power consumption is lower than that of the first operation mode, the program code causing the information processing apparatus to:
transmit a notification at a time when the information processing apparatus switches from the second operation mode to the first operation mode;
accept, through an application selection screen, a selection of an application;
generate, in response to the notification received from the display unit, the application selection screen through which the application can be selected; and
initiate generation of a plurality of application UI screens such that the initiation takes place after the transmission of the notification and before the acceptance of the selection of the application through the application selection screen, the plurality of application UI screens corresponding to a plurality of applications, respectively, the plurality of application UI screens including options for altering attributes of the applications corresponding to the application UI screens, respectively,
determine whether or not the selected application is a first application, from among the plurality of applications, and
display a first application UI screen, from among the plurality of application UI screens, when the selected application is determined to be the first application, the first application being the application corresponding to the first application UI screen.

7. An information processing system comprising:
a terminal; and
an information processing apparatus which has a first operation mode and a second operation mode in which power consumption is lower than that of the first operation mode, wherein
the terminal is configured to
   transmit a notification at a time when the information processing apparatus switches from the second operation mode to the first operation mode,
   accept, through an application selection screen, a selection of an application, and
the information processing apparatus is configured to
   generate, in response to the notification received from the display unit, the application selection screen through which the application can be selected,
   initiate generation of a plurality of application UI screens such that the initiation takes place after the transmission of the notification and before the acceptance of the selection of the application selection screen, the plurality of application UI screens corresponding to a plurality of applications, respectively, the plurality of application UI screens including options for altering attributes of the applications corresponding to the application UI screens, respectively,
   determine whether or not the selected application is a first application, from among the plurality of applications, and
   display a first application UI screen, from among the plurality of application UI screens, when the selected application is determined to be the first application, the first application being the application corresponding to the first application UI screen.

* * * * *